US009672757B2

(12) United States Patent
Becker et al.

(10) Patent No.: US 9,672,757 B2
(45) Date of Patent: Jun. 6, 2017

(54) MULTI-MODE SOFTWARE AND METHOD FOR A WELDING TRAINING SYSTEM

(71) Applicant: Illinois Tool Works Inc., Glenview, IL (US)

(72) Inventors: William J. Becker, Manitowoc, WI (US); Richard Beeson, Appleton, WI (US); Steven D. Hidden, Appleton, WI (US); Ashok Darisipudi, Aurora, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 13/838,158

(22) Filed: Mar. 15, 2013

(65) Prior Publication Data

US 2014/0272837 A1 Sep. 18, 2014

(51) Int. Cl.
*G09B 19/00* (2006.01)
*G09B 19/24* (2006.01)

(52) U.S. Cl.
CPC .................................... *G09B 19/24* (2013.01)

(58) Field of Classification Search
CPC . G09B 19/24; G09B 5/00; G09B 9/00; G09B 19/00; G09B 5/06; G09B 25/02; B23K 11/253; B23K 11/252; B23K 11/25; B23K 20/123; B23K 9/0953; B23K 9/0956; G05B 2219/39021; G05B 2219/39026; G05B 2219/39024
USPC ......................................... 434/219, 234, 260
See application file for complete search history.

(56) References Cited

U.S. PATENT DOCUMENTS

| | | | |
|---|---|---|---|
| 1,340,270 | A | 5/1920 | Jahoda |
| 2,045,800 | A | 6/1936 | Walther |
| 2,045,801 | A | 6/1936 | Richter |
| 2,045,802 | A | 6/1936 | Walther |
| 2,333,192 | A | 11/1943 | Moberg |
| 2,351,910 | A | 6/1944 | Blankenbuehler |
| 3,391,691 | A | 7/1968 | Young |
| 3,679,865 | A | 7/1972 | Jesnitzer |

(Continued)

FOREIGN PATENT DOCUMENTS

| | | | |
|---|---|---|---|
| CA | 2311685 | A1 | 12/2001 |
| CA | 2517874 | A1 | 12/2001 |

(Continued)

OTHER PUBLICATIONS

International Search Report from PCT application No. PCT/US2014/018107, dated Jun. 2, 2014, 3 pgs.

(Continued)

*Primary Examiner* — Robert J Utama
*Assistant Examiner* — Jerry-Daryl Fletcher
(74) *Attorney, Agent, or Firm* — Fletcher Yoder P.C.

(57) ABSTRACT

A welding training system includes a welding training software having three or more modes. The three or more modes include a live-arc mode, a simulation mode, a virtual reality mode, an augmented reality mode, or some combination thereof. The live-arc mode is configured to enable training using a live welding arc, the simulation mode is configured to enable training using a welding simulation, the virtual reality mode is configured to enable training using a virtual reality simulation, and the augmented reality mode is configured to enable training using an augmented reality simulation.

13 Claims, 20 Drawing Sheets

(56) References Cited

U.S. PATENT DOCUMENTS 3,867,769 A 2/1975 Schow et al.
4,028,522 A 6/1977 Chihoski et al.
4,041,615 A 8/1977 Whitehill
4,044,377 A 8/1977 Bowerman
4,124,944 A 11/1978 Blair
4,132,014 A 1/1979 Schow
4,144,766 A 3/1979 Wehrmeister
4,224,501 A 9/1980 Lindbom
4,253,648 A 3/1981 Meeks
4,294,440 A 10/1981 Severt
4,375,026 A 2/1983 Kearney
4,375,165 A 3/1983 deSterke
4,389,561 A 6/1983 Weman
4,396,945 A 8/1983 DiMatteo et al.
4,412,121 A 10/1983 Kremers
4,452,589 A 6/1984 Denison
4,459,114 A 7/1984 Barwick
4,471,207 A 9/1984 Hawkes
4,484,059 A 11/1984 Lillquist
4,518,361 A 5/1985 Conway
4,541,055 A 9/1985 Wolfe
4,555,614 A 11/1985 Morris
4,577,499 A 3/1986 Silke
4,590,356 A 5/1986 Povlick
4,591,689 A 5/1986 Brown et al.
4,594,497 A 6/1986 Takahashi
4,595,186 A 6/1986 Reed
4,595,368 A 6/1986 Cole
4,595,820 A 6/1986 Richardson
4,609,806 A 9/1986 Grabkowski et al.
4,628,176 A 12/1986 Kojima et al.
4,638,146 A 1/1987 Koyama
4,677,277 A 6/1987 Cook
4,680,014 A 7/1987 Paton et al.
4,689,021 A 8/1987 Vasiliev et al.
4,716,273 A 12/1987 Paton et al.
4,721,947 A 1/1988 Brown
4,728,768 A 3/1988 Cueman
4,739,404 A 4/1988 Richardson
4,767,109 A 8/1988 Raketich
4,829,365 A 5/1989 Eichenlaub
4,830,261 A 5/1989 Mello
4,867,685 A 9/1989 Brush et al.
4,868,649 A 9/1989 Gaudin
4,877,940 A 10/1989 Bangs
4,881,678 A 11/1989 Gaudin
4,920,249 A 4/1990 McLaughlin
4,931,018 A 6/1990 Herbst et al.
4,937,427 A 6/1990 McVicker
4,943,702 A 7/1990 Richardson
4,954,690 A 9/1990 Kensrue
4,992,881 A 2/1991 Tomasek
4,996,409 A 2/1991 Paton et al.
5,061,841 A 10/1991 Richardson
5,103,376 A 4/1992 Blonder
5,185,561 A 2/1993 Good et al.
5,208,436 A 5/1993 Blankenship
5,211,564 A 5/1993 Martinez et al.
5,231,928 A 8/1993 Phillips
5,243,265 A 9/1993 Matsuura
5,283,418 A 2/1994 Bellows et al.
5,302,799 A 4/1994 Kennedy
5,304,774 A 4/1994 Durheim
5,306,893 A 4/1994 Morris
5,320,538 A 6/1994 Baum
5,343,011 A 8/1994 Fujii et al.
5,380,978 A 1/1995 Pryor
5,397,872 A 3/1995 Baker et al.
5,404,181 A 4/1995 Hung
5,426,732 A 6/1995 Boies et al.
5,448,405 A 9/1995 Clausen
5,464,957 A 11/1995 Kidwell et al.
5,508,757 A 4/1996 Chen
5,514,846 A 5/1996 Cecil et al.
5,517,420 A 5/1996 Kinsman et al.
5,521,843 A 5/1996 Hashima et al.
5,533,146 A 7/1996 Iwai
5,543,863 A 8/1996 Lin
5,546,476 A 8/1996 Mitaka
5,571,431 A 11/1996 Lantieri
5,592,241 A 1/1997 Kita
5,617,335 A 4/1997 Hashima et al.
5,659,479 A 8/1997 Duley et al.
5,668,612 A 9/1997 Hung
5,674,415 A 10/1997 Leong et al.
5,675,229 A 10/1997 Thorne
5,681,490 A 10/1997 Chang
5,708,253 A 1/1998 Bloch et al.
5,709,219 A 1/1998 Chen
5,747,042 A 5/1998 Choquet
5,823,785 A 10/1998 Matherne, Jr.
5,832,139 A 11/1998 Batterman et al.
5,845,053 A 12/1998 Watanabe
5,856,844 A 1/1999 Batterman et al.
5,930,093 A 7/1999 Morrissett
5,961,859 A 10/1999 Chou
5,973,677 A 10/1999 Gibbons
5,999,909 A 12/1999 Rakshit et al.
6,003,052 A 12/1999 Yamagata
6,018,729 A 1/2000 Zacharia et al.
6,019,359 A 2/2000 Fly
6,024,273 A 2/2000 Ludewig
6,033,226 A 3/2000 Bullen
6,039,494 A 3/2000 Pearce
6,046,754 A 4/2000 Stanek
6,049,059 A 4/2000 Kim
6,051,805 A 4/2000 Vaidya
6,101,455 A 8/2000 Davis
6,107,601 A 8/2000 Shimogama
6,130,407 A 10/2000 Villafuerte
6,153,848 A 11/2000 Nagae
6,155,475 A 12/2000 Ekelof
6,163,946 A 12/2000 Pryor
6,226,395 B1 5/2001 Gilliland
6,236,017 B1 5/2001 Smartt
6,242,711 B1 6/2001 Cooper
6,271,500 B1 8/2001 Hirayama
6,288,359 B1 9/2001 Koch
6,290,740 B1 9/2001 Schaefer
6,301,763 B1 10/2001 Pryor
6,315,186 B1 11/2001 Friedl
6,329,635 B1 12/2001 Leong et al.
6,337,458 B1 1/2002 Lepeltier
6,371,765 B1 4/2002 Wall et al.
6,417,894 B1 7/2002 Goff et al.
6,441,342 B1 8/2002 Hsu
6,445,964 B1 9/2002 White
6,469,752 B1 10/2002 Ishikawa
6,476,354 B1 11/2002 Jank
6,479,793 B1 11/2002 Wittmann
6,506,997 B2 1/2003 Matsuyama
6,516,300 B1 2/2003 Rakshit et al.
6,572,379 B1 6/2003 Sears et al.
6,583,386 B1 6/2003 Ivkovich
6,596,972 B1 * 7/2003 Di Novo et al. .......... 219/137.9
6,614,002 B2 9/2003 Weber
6,621,049 B2 9/2003 Suzuki
6,622,906 B1 9/2003 Kushibe
6,647,288 B2 11/2003 Madill
6,670,574 B1 12/2003 Bates
6,697,761 B2 2/2004 Akatsuka et al.
6,703,585 B2 3/2004 Suzuki
6,710,298 B2 3/2004 Eriksson
6,728,582 B1 4/2004 Wallack
6,734,393 B1 5/2004 Friedl
6,744,011 B1 6/2004 Hu
6,748,249 B1 6/2004 Eromaki
6,750,428 B2 6/2004 Okamoto
6,753,909 B1 6/2004 Westerman
6,768,974 B1 7/2004 Nanjundan et al.
6,795,068 B1 9/2004 Marks
6,839,049 B1 1/2005 Koizumi
6,857,553 B1 2/2005 Hartman
6,868,726 B2 3/2005 Lemkin

(56) References Cited

U.S. PATENT DOCUMENTS 6,910,971 B2 6/2005 Alsenz
6,927,360 B2 8/2005 Artelsmair et al.
6,937,329 B2 8/2005 Esmiller
6,967,635 B2 11/2005 Hung
6,977,357 B2 12/2005 Hsu et al.
6,995,536 B2 2/2006 Challoner
7,015,419 B2 3/2006 Hackl
7,025,053 B1 4/2006 Altamirano
7,032,814 B2 4/2006 Blankenship
7,045,742 B2 5/2006 Feichtinger
7,081,888 B2 7/2006 Cok
7,120,473 B1 10/2006 Hawkins
7,132,617 B2 11/2006 Lee
7,132,623 B2 11/2006 De Miranda et al.
7,150,047 B2 12/2006 Fergason
7,173,215 B1 2/2007 Kapoor
7,181,413 B2 2/2007 Hadden et al.
7,226,176 B1 6/2007 Huang
7,261,261 B2 8/2007 Ligertwood
7,342,210 B2 3/2008 Fergason
7,358,458 B2 4/2008 Daniel
7,465,230 B2 12/2008 LeMay
7,474,760 B2 1/2009 Hertzman et al.
7,523,069 B1 4/2009 Friedl
7,564,005 B2 7/2009 Cabanaw et al.
7,574,172 B2 8/2009 Clark et al.
7,577,285 B2 8/2009 Schwarz
D614,217 S 4/2010 Peters et al.
7,698,094 B2 4/2010 Aratani et al.
D615,573 S 5/2010 Peters et al.
7,766,213 B2 8/2010 Henrikson
7,789,811 B2 9/2010 Cooper
7,826,984 B2 11/2010 Sjostrand
7,831,098 B2 11/2010 Melikian
7,839,416 B2 11/2010 Ebensberger et al.
7,845,560 B2 12/2010 Emanuel et al.
D631,074 S 1/2011 Peters et al.
7,899,618 B2 3/2011 Ledet
8,019,144 B2 9/2011 Sugihara
8,044,942 B1 10/2011 Leonhard
8,046,178 B2 10/2011 Dai
8,100,694 B2 1/2012 Portoghese
8,110,774 B2 2/2012 Huonker
8,235,588 B2 8/2012 Louban
8,248,324 B2 8/2012 Nangle
8,274,013 B2 9/2012 Wallace
8,393,519 B2 3/2013 Allehaux
8,406,682 B2 3/2013 Elesseily
8,431,862 B2 4/2013 Kachline
8,432,476 B2 4/2013 Ashforth
8,502,866 B2 8/2013 Becker
8,512,043 B2 8/2013 Choquet
8,541,746 B2 9/2013 Andres
8,657,605 B2 2/2014 Wallace
8,681,178 B1 3/2014 Tseng
8,692,157 B2 4/2014 Daniel
8,698,843 B2 4/2014 Tseng
8,747,116 B2 6/2014 Zboray
8,777,629 B2 7/2014 Kreindl
8,803,908 B2 8/2014 Van Osten
8,834,168 B2 9/2014 Peters
8,851,896 B2 10/2014 Wallace
8,860,760 B2 10/2014 Chen
8,911,237 B2 12/2014 Postlethwaite
8,915,740 B2 12/2014 Zboray
8,946,595 B2 2/2015 Ishida
8,953,033 B2 2/2015 Yamane
8,953,909 B2 2/2015 Guckenberger
8,987,628 B2 3/2015 Daniel
8,990,842 B2 3/2015 Rowley
9,011,154 B2 4/2015 Kindig
9,012,802 B2 4/2015 Daniel
9,050,678 B2 6/2015 Daniel
9,050,679 B2 6/2015 Daniel
9,089,921 B2 7/2015 Daniel
9,196,169 B2 11/2015 Wallace
9,218,745 B2 12/2015 Choquet
9,269,279 B2 2/2016 Penrod
9,293,056 B2 3/2016 Zboray
9,293,057 B2 3/2016 Zboray
9,318,026 B2 4/2016 Peters
9,330,575 B2 5/2016 Peters
9,336,686 B2 5/2016 Peters
9,402,122 B2 7/2016 Richardson
2001/0026445 A1 10/2001 Naghi
2001/0032508 A1 10/2001 Lemkin
2002/0043607 A1 4/2002 Tajima
2002/0071550 A1 6/2002 Pletikosa
2002/0105797 A1 8/2002 Navid
2002/0114653 A1 8/2002 Gatta
2002/0148745 A1 10/2002 Chang
2002/0153354 A1 10/2002 Norby et al.
2003/0011673 A1 1/2003 Eriksson
2003/0092496 A1 5/2003 Alsenz
2003/0172032 A1 9/2003 Choquet
2004/0058703 A1 3/2004 Eromaki
2004/0068335 A1 4/2004 Ferla
2004/0069754 A1 4/2004 Bates et al.
2004/0175684 A1 9/2004 Kaasa
2004/0223148 A1 11/2004 Takemura
2004/0227730 A1 11/2004 Sugihara
2004/0251910 A1 12/2004 Smith
2005/0006363 A1 1/2005 Hsu et al.
2005/0012598 A1 1/2005 Berquist
2005/0016979 A1 1/2005 Stein
2005/0017152 A1 1/2005 Fergason
2005/0073506 A1 4/2005 Durso
2005/0127052 A1 6/2005 Spencer
2005/0133488 A1 6/2005 Blankenship
2005/0135682 A1 6/2005 Abrams, Jr. et al.
2005/0179654 A1 8/2005 Hawkins
2005/0197115 A1 9/2005 Clark et al.
2005/0207102 A1 9/2005 Russo
2005/0227635 A1 10/2005 Hawkins
2005/0256611 A1 11/2005 Pretlove
2006/0010551 A1 1/2006 Bishop
2006/0081740 A1 4/2006 Bellavance
2006/0136183 A1 6/2006 Choquet
2006/0151446 A1 7/2006 Schneider
2006/0163228 A1 7/2006 Daniel
2006/0173619 A1 8/2006 Brant et al.
2006/0212169 A1 9/2006 Luthardt
2006/0241432 A1 10/2006 Herline
2007/0038400 A1 2/2007 Lee
2007/0051711 A1 3/2007 Kachline
2007/0114215 A1 5/2007 Bill
2007/0115202 A1 5/2007 Kiesenhofer
2007/0164006 A1 7/2007 Burgstaller
2007/0187378 A1 8/2007 Karakas
2007/0188606 A1 8/2007 Atkinson et al.
2007/0221636 A1 9/2007 Monzyk
2007/0247793 A1 10/2007 Carnevali
2007/0248261 A1 10/2007 Zhou
2007/0264620 A1 11/2007 Maddix
2007/0278196 A1 12/2007 James et al.
2007/0291166 A1 12/2007 Misawa
2008/0030631 A1 2/2008 Gallagher
2008/0038702 A1 2/2008 Choquet
2008/0061113 A9 3/2008 Seki
2008/0077422 A1 3/2008 Dooley
2008/0124698 A1 5/2008 Ebensberger
2008/0128395 A1 6/2008 Aigner
2008/0149602 A1 6/2008 Lenzner
2008/0149608 A1 6/2008 Albrecht
2008/0158502 A1 7/2008 Becker
2008/0168290 A1 7/2008 Jobs
2008/0169277 A1 7/2008 Achtner
2008/0234960 A1 9/2008 Byington
2008/0314887 A1 12/2008 Stoger
2009/0005728 A1 1/2009 Weinert et al.
2009/0057286 A1 3/2009 Ihara et al.
2009/0109128 A1 4/2009 Nangle
2009/0146359 A1 6/2009 Canfield
2009/0152251 A1 6/2009 Dantinne

(56) References Cited

U.S. PATENT DOCUMENTS

2009/0161212 A1 6/2009 Gough
2009/0173726 A1 7/2009 Davidson et al.
2009/0189974 A1 7/2009 Deering
2009/0200281 A1 8/2009 Hampton
2009/0200282 A1 8/2009 Hampton
2009/0230107 A1 9/2009 Ertmer
2009/0231423 A1 9/2009 Becker et al.
2009/0249606 A1 10/2009 Diez et al.
2009/0283021 A1 11/2009 Wong
2009/0298024 A1 12/2009 Batzler et al.
2009/0323121 A1 12/2009 Valkenburg
2010/0020483 A1 1/2010 Ma
2010/0048273 A1 2/2010 Wallace et al.
2010/0062405 A1 3/2010 Zboray et al.
2010/0062406 A1 3/2010 Zboray et al.
2010/0088793 A1 4/2010 Ghisleni
2010/0123664 A1 5/2010 Shin
2010/0133247 A1 6/2010 Mazumder
2010/0145520 A1 6/2010 Gerio
2010/0201803 A1 8/2010 Melikian
2010/0207620 A1 8/2010 Gies
2010/0224610 A1 9/2010 Wallace
2010/0238119 A1 9/2010 Dubrovsky
2010/0245273 A1 9/2010 Hwang
2010/0283588 A1 11/2010 Gomez
2010/0291313 A1 11/2010 Ling
2010/0314362 A1 12/2010 Albrecht
2011/0000892 A1 1/2011 Mueller et al.
2011/0006047 A1 1/2011 Penrod et al.
2011/0091846 A1 4/2011 Kreindl et al.
2011/0092828 A1 4/2011 Spohn
2011/0114615 A1 5/2011 Daniel et al.
2011/0117527 A1 5/2011 Conrardy et al.
2011/0176720 A1 7/2011 VanOsten
2011/0183304 A1 7/2011 Wallace et al.
2011/0198329 A1 8/2011 Davidson
2011/0220616 A1 9/2011 Mehn
2011/0220619 A1 9/2011 Mehn
2011/0240605 A1 10/2011 Takayama
2011/0249090 A1 10/2011 Moore
2011/0284508 A1 11/2011 Miura
2011/0286005 A1 11/2011 Yamamoto
2011/0290765 A1 12/2011 Albrecht et al.
2011/0313731 A1 12/2011 Vock
2012/0007748 A1 1/2012 Forgues
2012/0048838 A1 3/2012 Ishida
2012/0072021 A1 3/2012 Walser
2012/0077174 A1 3/2012 DePaul
2012/0105476 A1 5/2012 Tseng
2012/0113512 A1 5/2012 Tsanev
2012/0122062 A1 5/2012 Yang
2012/0175834 A1 7/2012 Hamm
2012/0180180 A1 7/2012 Steve
2012/0188365 A1 7/2012 Stork
2012/0189993 A1 7/2012 Kindig et al.
2012/0205359 A1 8/2012 Daniel
2012/0231894 A1 9/2012 Nicora
2012/0248080 A1 10/2012 Hutchison
2012/0248083 A1 10/2012 Garvey
2012/0291172 A1 11/2012 Wills
2012/0298640 A1 11/2012 Conrardy
2012/0323496 A1 12/2012 Burroughs
2013/0040270 A1 2/2013 Albrecht
2013/0081293 A1 4/2013 Delin
2013/0182070 A1 7/2013 Peters
2013/0189656 A1 7/2013 Zboray
2013/0189658 A1 7/2013 Peters
2013/0200882 A1 8/2013 Almalki
2013/0206741 A1 8/2013 Pfeifer
2013/0209976 A1 8/2013 Postlethwaite
2013/0262000 A1 10/2013 Hutchison
2013/0264315 A1 10/2013 Hung
2013/0264322 A1 10/2013 Bornemann
2013/0288211 A1* 10/2013 Patterson et al. ............. 434/234
2013/0326842 A1 12/2013 Pearson
2014/0008088 A1 1/2014 Chellew
2014/0017642 A1 1/2014 Postlethwaite
2014/0042135 A1 2/2014 Daniel
2014/0042137 A1 2/2014 Daniel
2014/0069899 A1 3/2014 Mehn
2014/0131337 A1 5/2014 Williams
2014/0134579 A1 5/2014 Becker
2014/0134580 A1 5/2014 Becker
2014/0184496 A1 7/2014 Gribetz
2014/0220522 A1 8/2014 Peters
2014/0234813 A1 8/2014 Peters
2014/0263224 A1 9/2014 Becker
2014/0263227 A1 9/2014 Daniel
2014/0267773 A1 9/2014 Jeung
2014/0272835 A1 9/2014 Becker
2014/0272836 A1 9/2014 Becker
2014/0272837 A1 9/2014 Becker
2014/0272838 A1 9/2014 Becker
2014/0315167 A1 10/2014 Kreindl
2014/0322684 A1 10/2014 Wallace
2014/0346158 A1 11/2014 Matthews
2014/0346793 A1 11/2014 DeStories
2014/0374396 A1 12/2014 Luo
2015/0056584 A1 2/2015 Boulware
2015/0056585 A1 2/2015 Boulware
2015/0170539 A1 6/2015 Barrera
2015/0209887 A1 7/2015 DeLisio
2015/0325153 A1 11/2015 Albrecht
2016/0093233 A1 3/2016 Boulware
2016/0203734 A1 7/2016 Boulware
2016/0203735 A1 7/2016 Boulware
2016/0236303 A1 8/2016 Matthews

FOREIGN PATENT DOCUMENTS

CA 2549553 A1 7/2004
CA 2554498 A1 4/2006
CN 1866317 11/2006
CN 201181527 1/2009
CN 102049595 5/2011
CN 202877704 4/2013
DE 202010011064 10/2010
DE 102010038902 2/2012
EP 0323277 A2 7/1989
EP 0878263 11/1998
EP 0963744 A1 12/1999
EP 1029306 A1 8/2000
EP 01949147.1 6/2001
EP 03788729.6 12/2003
EP 05791580.3 9/2005
EP 1864744 12/2007
ES 2438440 1/2014
FR 1456780 7/1966
FR 2827066 1/2003
GB 2454232 A 5/2009
JP H11146387 5/1999
JP 2000298427 10/2000
JP 2004181493 7/2004
JP 2007021542 2/2007
JP 2009125790 6/2009
KR 100876425 B1 12/2008
SU 972552 11/1982
SU 1354234 A1 11/1987
SU 1489933 A1 6/1989
SU 1638145 3/1991
WO 9958286 11/1999
WO 03019349 1/2003
WO 2004057554 A2 7/2004
WO 2005102230 A1 11/2005
WO 2005110658 A2 11/2005
WO 2006004427 1/2006
WO 2006034571 A1 4/2006
WO 2007009131 1/2007
WO 2007044135 4/2007
WO 2009022443 2/2009
WO 2009053829 A2 4/2009
WO 2009060231 A1 5/2009
WO 2009092944 A1 7/2009
WO 2009146359 12/2009

(56) References Cited

FOREIGN PATENT DOCUMENTS

| | | | |
|---|---|---|---|
| WO | 2010000003 | A2 | 1/2010 |
| WO | 2010020867 | A2 | 2/2010 |
| WO | 2010020869 | | 2/2010 |
| WO | 2010020870 | A2 | 2/2010 |
| WO | 2010111722 | | 10/2010 |
| WO | 2011112493 | | 9/2011 |
| WO | 2011150165 | | 12/2011 |
| WO | 2012137060 | | 10/2012 |
| WO | 2013138831 | | 1/2013 |
| WO | 2013023012 | | 2/2013 |
| WO | 2014007830 | | 1/2014 |
| WO | 2014074296 | | 5/2014 |
| WO | 2014140719 | | 9/2014 |

OTHER PUBLICATIONS

International Search Report from PCT application No. PCT/US2014/018113, dated Jun. 2, 2014, 3pgs.
International Search Report from PCT application No. PCT/US2014/018109, dated Jun. 2, 2014, 4 pgs.
International Search Report from PCT application No. PCT/US2014/018114, dated Jun. 2, 2014, 4 pgs.
U.S. Appl. No. 61/639,414, filed Apr. 27, 2012.
U.S. Appl. No. 61/724,321, filed Nov. 9, 2012.
U.S. Appl. No. 61/724,322, filed Nov. 9, 2012.
http://www.123arc.com Simulation and Certification; 2000.
123arc.com—"Weld into the future"; 2000.
Image from Sim Welder.com—R-V's Welder Training Goes Virtual, www.rvii.com/PDF/simwelder.pdf ; Jan. 2010.
Lincoln Electric VRTEX® Virtual Reality Arc Welding Trainer; http://www.lincolnelectric.com/en-us/equipment/training-equipment/pages/vrtex360.aspx; ; 1999.
Fronius International GmbH—Focus on welding—Fronius Virtual Welding; http://www.fronius.com/cps/rde/xchg/SID-99869147-0110E322/fronius_international/hs.xsl/79_15490_ENG_HTML.htm; 2006.
Porter, Nancy C., Edison Welding Institute; J. Allan Cote, General Dynamics Electric Boat; Timothy D. Gifford, VRSim; and Wim Lam, FCS Controls—Virtual Reality Welder Training—Session 5: Joining Technologies for Naval Applications. 2007.
Fast et al., Virtual Training for Welding, Proceedings of the Third IEEE and ACM International Symposium on Mixed and Augmented Reality (ISMAR 2004); 0/7695-2191-6/04; 2004.
Porter et al., EWI—CRP Summary Report SR0512, Jul. 2005—Virtual Reality Welder Training.
Porter, Nancy C., Edison Welding Institute; J. Allan Cote, General Dynamics Electric Boat; Timothy D. Gifford, VRSim; and Wim Lam, FCS Controls—Virtual Reality Welder Training—Project No. S1051 Navy Man Tech Program; Project Review for Ship Tech 2005,—Mar. 1, 2005, Biloxi, MS.
Fridenfalk et al., Design and Validation of a Universal 6D Seam Tracking System in Robotic Welding Based on Laser Scanning, Industrial Robotics: Programming, Simulation and Applicationl, ISBN 3-86611-286-6, pp. 702, ARS/pIV, Germany, Dec. 2006, edited by Kin Huat.
Virtual Reality Training Manual Module 1—Training Overview—A Guide for Gas Metal Arc Welding—EWI 2006.
thefabricator.com—Arc Welding Article; Heston, Tim, Virtual welding—Training in a virtual environment gives welding students a leg up—Mar. 11, 2008.
Jo et al., Visualization of Virtual Weld Beads, VRST 2009, Kyoto, Japan, Nov. 18-20, 2009; Electronics and Telecommunications Research Institute (ETRI) ACM 978-1 60558-869-8/09/0011.
Choquet, Claude, ARC+® & ARC PC Welding Simulators: Teach Welders with Virtual Interactive 3D Technologies; Jul. 2010.
Choquet, Claude, Arc+®: Today's Virtual Reality Solution for Welders, Jun. 1, 2008.
National Science Foundation—Where Discoveries Begin—Science and Engineering's Most Powerful Statements Are Not Made From Words Alone—Entry Details for NSF International Science & Engineering Visualization Challenge, Public Voting ended on Mar. 9, 2012; Velu the welder by Muralitharan Vengadasalam—Sep. 30, 2011; https://nsf-scivis.skild.com/skild2/NationalScienceFoundation/viewEntryDetail.action?pid. . .
GAWDA—Welding & Gases Today Online | GAWDA Media Blog; Will Games Turn Welding into a Virtual Market? Friday, Dec. 2, 2011; http://www.weldingandgasestoday.org/blogs/Devin-OToole/index.php/ta. . .
American Welding Society's Virtual Welding Trailer to Debut at FABTECH Careers in Welding Trailer Appeals to New Generation of Welders, Miami, Fla., Nov. 3, 2011.
NZ Manufacturer Game promotes welding trade careers; http://nzmanufacturer.co.nz/2011/11/game-promotes-welding-trade-careers/. . . Competenz Industry Training; www.competenz.org.nz; Game promotes welding trade careers, Nov. 7, 2011.
Fronius Perfect Welding; 06,3082, EN v01 2010 aw05 ; Virtual Welding—The training method of the future; Feb. 20, 2012.
Impact Spring 2012 vol. 12, No. 2, Undergraduate Research in Information Technology Engineering, University of Virginia School of Engineering & Applied Science.; 2012.
TCS News&Events: Press Release: TCS wins the "People Choice" award from National Science Foundaton, USA, pp. 1-6; Press Release May 21, 2012; http://www.tsc.com/news_events/press_releases/Pages/TCS_People_Choice_award_Natio . . . .
Quebec International, May 28, 2008 "Video Game" Technology to Fill Growing Need; http://www.mri.gouv.qc.ca/portail/_scripts/actualities/viewnew.asp?NewID=5516&strIdSit.
Fronius "The Ghost": http://www.fronius.com/cps/rde/xchg/SID-3202EAB7- AE082518/fronius_international/hs.xs1/79_15490_ENG_HTML.htm; 2006.
teachWELD: Welding Simulator/Hands-On Learning for Welding: http://realityworks.com/products/teachweld-welding-simulator; 2012.
OptiTrack: Motion Capture Systems: http://www.naturalpoint.com/optitrack/, Mar. 2005.
Vicon: Motion Capture Systems: http://vicon.com/, Dec. 1998.
PhaseSpace: Optical Motion Capture: http://phasespace.com/, 2009.
Polhemus: Innovation in Motion: http://polhemus.com/?page=reseachandtechnology, 1992.
Ascension Technology Corporation: Tracking 3D Worlds: http://ascension-tech.com/, Dec. 1996.
Maccormick, John; How does the Kinect work?; http://users.dickinson.edu/~jmac/selected-talks/kinect.pdf , Dec. 1, 2011.
Leap Motion; https://www.leapmotion.com/, May 2012.
Playstation; Move Motion Controller: http://us.playstation.com/ps3/playstation-move/, Mar. 2010.
Kiwinakiful; Holographic TVcoming 2012 (as seen on BBC); http://www.youtube.com/watch?v=Ux6aD6vE9sk&feature=related, Jul. 2, 2011.
Kooima, Robert; Kinect +3D TV=Virtual Reality; http://www.youtube.com/watch?v=2MX1RinEXUM&feature=related, Feb. 26, 2011.
ShotOfFuel; Wii Head Tracking for 3D, http://www.youtube.com/watch?v=1x5ffF-0Wr4, Mar. 19, 2008.
Natural Point, Trackir; http://www.naturalpoint.com/trackir/, Dec. 2003.
White, S., et al., "Low-Cost Simulated MIG Welding for Advancement in Technical Training," Virtual Reality, 15, 1, 69-81, Mar. 2011. ISSN:13594338 [Retrieved from EBSCOhost, Jun. 15, 2015].
International Search Report from PCT application No. PCT/US2014/065512, dated Jun. 8, 2015, 17 pgs.
Hillers, Bernd, Dorin Aiteanu, Axel Graser, "Augmented Reality—Helmet for the Manual Welding Process," Virtual and Augmented Reality Applications in Manufacturing, Institute of Automation, Universtity of Bremen, 2004.
Central Welding Supply http://www.welders-direct.com/ Feb. 29, 2000.
Cybernetics: Enhancing Human Performance found in the DTIC Review dated Mar. 2001, p. 186/19. See http://www.dtic.mil/dtic/tr/fulltext/u2/a385219.pdf.
Evaluating Two Novel Tactile Feedback Devices, by Thomas Hulin, Phillipp Kremer, Robert Scheibe, Simon Schaetzle and Carsten

(56) References Cited

OTHER PUBLICATIONS

Preusche presented at the 4th International Conference on Enactive Interfaces, Grenoble, France, Nov. 19-22, 2007.
ftp://www.hitl.washington.edu/pub/scivw/publications/IDS-pdf/HAPTIC1.PDF, (University of Washington): Table 11, Tactile Feedback Actuator Technologies, p. 119, below the table is a. Based on Hasser (1995, 1996).
Haptic Feedback for Virtual Reality by Grigore C. Burdea dated 1996.
Hemez, Francois M., Scott W. Doebling, "Uncertainty, Validation of Computer Models an the Myth of Numerical Predictability," Engineering Analysis Group (ESA-EA), Los Alamos National Laboratory, dated 2004.
Integrated Microelectromechanical Gyrosopes; Journal of Aerospace Engineering, Apr. 2003 pp. 65-75 (p. 65) by Huikai Xie and Garry K. Fedder.
Numerical Simulation F Arc Welding Process and its Application Dissertation for Ohio State University by Min Hyun Cho, M.S. 2006: See Internet as this document is security protected) ohttps://etd.ohiolink.edu/ ap:0:0:Application_Process=Download_ETD_SUB_DOC_ACCNUM:::F1501_ID:osu1155741113, attachment.
International Search Report for PCT application No. PCT/US2009/045436, dated Nov. 9, 2009, 3 pgs.
Ryu, Jonghyun, Jaehoon Jung, Seojoon Kim, and Seungmoon Choi, "Perceptually Transparent Vibration Rendering Using a Vibration Motor for Haptic Interaction," 16 IEEE International Conference on Robot & Human Interactive Communication, Jeju, Korea, Aug. 26-29, 2007.
The Rutgers Master II—New Design Force-Feedback Glove by Mourad Bouzit, Member, IEEE,Grigore Burdea, Senior Member, IEEE, George Popescu, Member, IEEE, and Rares Bolan, Student Member, found in IEEE/ASME Transactions on Mechatronics, vol. 7, No. 2, Jun. 2002.
International Search Report for PCT application No. PCT/US2013/066037 dated Mar. 11, 2014, 10 pgs.
International Search Report for PCT application No. PCT/US2013/066040 dated Mar. 11, 2014, 12 pgs.
International Search Report for PCT application No. PCT/US2012/050059 dated Nov. 27, 2012, 16 pgs.
International Search Report for PCT application No. PCT/US2013/038371 dated Jul. 31, 2013, 8 pgs.
Aiteanu, Dorin, and Axel Graser, "Computer-Aided Manual Welding Using an Augmented Reality Supervisor," Sheet Metal Welding Conference XII, Livoinia, MI, May 9-12, 2006, pp. 1-14.
Echtler, Florian, Fabian Stuurm, Kay Kindermann, Gudrun Klinker, Joachim Stilla, Jorn Trilk, Hesam Najafi, "The Intelligent Welding Gun: Augmented Reality for Experimental Vehicle Construction," Virtual and Augmented Reality Applications in Manufacturing, Ong S.K and Nee A.Y.C., eds., Springer Verlag, 2003, pp. 1-27.
Himperich, Frederick, "Applications in Augmented Reality in the Automotive Industry," Fachgebiet Augmented Reality, Department of Informatics, Jul. 4, 2007, pp. 1-21.
Sandor, Christian, Gudrun Klinker, "PAARTI: Development of an Intelligent Welding Gun for BMW," PIA 2003, Tokyo, Japan, Technical University of Munich Department of Informatics, Oct. 7, 2003.
Gundersen, O., et al. "The Use of an Integrated Multiple Neural Network Structure for Simultaneous Prediction of Weld Shape, Mechanical Properties, and Distortion in 6063-T6 and 6082-T6 Aluminum Assemblies", Mathematical Modelling of Weld Phenomena, vol. 5, Maney Publishing, 2001.
ArcSentry Weld Monitoring System, Version 3, Users Manual, Native American Technologies, Golden, CO, Dec. 10, 1999.
NAMeS, Native American Technologies Weld Measuring Software, Users Guide, 2000.
Native American Technologies, "Process Improvement Products" web page, http://web.archive.org/web/20020608050736/http://www.natech-inc.com/ products.html, published Jun. 8, 2002.
Native American Technologies, "Official NAMeS Web Site" web page, http:// web.archive.org/web/20020903210256/http://www.natech-inc.com/names/ names.html, published Sep. 3, 2002.
Native American Technologies, "ArcSentry Weld Quality Monitoring System" web page, http://web.archive.org/web/20020608124903/http://www.natech-inc.com/arcsentry1/ index.html, published Jun. 8, 2002.
Native American Technologies, "P/NA.3 Process Modelling and Optimization" web pages, http://web.archive.org/web/20020608125619/http://www.natech-inc.com/pna3/index.html, published Jun. 8, 2002.
Native American Technologies, "ArcDirector Weld Controller" web page, http:// web.archive.org/web/20020608125127/http://www.natech-inc.com/arcdirector/ index.html, published Jun. 8, 2002.
International Search Report from PCT No. PCT/US2014/067951, dated Feb. 24, 2015, 10 pgs.
"Vision for Welding Industry," American Welding Society, Apr. 22, 1999,http:// www.aws.org/library/doclib/vision.pdf.
"NJC Technology Displayed at ShipTech 2005", Welding Journal, vol. 84, No. 3, Mar. 2005, p. 54, https://app.aws.org/w/r/www/wj/2005/03/Wj_2005_03.pdf.
"Virtual Welding: A Low Cost Virtual Reality Welder Training System," NSRP ASE, Feb. 19, 2009, http://www.nsrp.org/6-Presentations/WD/020409_Virtual_Welding_Wilbur.pdf.
"Low Cost Virtual Reality Welding Training System," NSRP Joint Panel Meeting, Apr. 21, 2010, http://www.nsrp.org/6-Presentations/Joint/042110_Low_Cost_Virtual_Reality_Welder_Training_System_Fast.pdf.
"Virtual Reality Program to Train Welders for Shipbuilding", American Welding Society, Navy Joining Center, https://app.aws.org/wj/2004/04/052/.
Stone, R. T., K. Watts, and P. Zhong, "Virtual Reality Integrated Welder Training, Welding Research," Welding Journal, vol. 90, Jul. 2011, pp. 136-s-141-s, https://app.aws.org/wj/supplement/wj201107_s136.pdf.
"Virtual Reality Welder Training Initiatives: Virtual Welding Lab Pilot," Paul D. Camp Community College, Advanced Science & Automation Corporation, Northrop Grumman Newport News, Nov. 22, 2006, http://www.nsrp.org/6-Presentations/WD/103106_Virtual_Reality_Welder.pdf.
Bender Shipbuilding and Repair, Co., "Virtual Welding—A Low Cost Virtual Reality Welder Training System", Technical Proposal, Jan. 23, 2008.
"Virtual Welding—A Low Cost Virtual Reality Welder Training System", Interim Status Report # 4, Technology Investment Agreement 2008-600, Feb. 18, 2009, http://www.nsrp.org/3-Key_Deliverables/FY08_Low-Cost_Virtual_Reality_Welder_Trainer/FY08_Low-Cost_Virtual_Reality_Welder_Trainer-Interim2.pdf.
"Sheet Metal Conference XXII," Conference Program, American Welding Society, May 2006, Detroit.
"Welding in Defense Industry," American Welding Society conference schedule, 2004. https://app.aws.org/conferences/defense/live_index.html.
"Welding Technology Roadmap," prepared by Energetics, Inc., Columbia, MD, in cooperation with the American Welding Society and the Edison Welding Institute, Sep. 2000.
Advance Program of American Welding Society Programs and Events, Nov. 11-14, 2007, Chicago.
Aiteanu, Dorian, and Axel Graeser; "Generation and Rendering of a Virtual Welding Seam in an Augmented Reality Training Environment," Proceedings of the Sixth IASTED International Conference on Visualization, Imaging, and Image Processing, Aug. 28-30, 2006, Palma de Mallorca, Spain, ED. J.J. Villaneuva, ACTA Press, 2006.
Aiteanu, Dorin, et al., "A Step Forward in Manual Welding: Demonstration of Augmented Reality Helmet," Institute of Automation, University of Bremen, Germany, 2003.
American Welding Society Forms: typical Procedure Qualification Record and Welding Procedure Specification forms.
ARVIKA Forum Vorstellung Projeckt PAARA, BMW Group Virtual Reality Center, Nuernberg, 2003.

(56) References Cited

OTHER PUBLICATIONS

Barckhoff, J.R.; "Total Welding Managemet," American Welding Society, 2005.
Fast, Kenneth, Jerry Jones, and Valerie Rhoades; "Virtual Welding—A Low Cost Virtual Reality Welder Training System Phase II," National Shipbuilding Research Program (NSRP), NSRP ASE Technology Investment Agreement No. 2010-357, Feb. 29, 2012, http://www.nsrp.org/3-Ra-Panel_Final_Reports/ FY08_Virtual_Welder_Final_Report.pdf.
Fite-Georgel, Pierre; "Is there a Reality in Industrial Augmented Reality?" 10th IEEE International Symposium on Mixed and Augmented Reality (ISMAR), 2011.
Hillers, B, and Axel Graeser, "Direct welding arc observation withouth harsh flicker," FABTECH International and AWS Welding Show, 2007.
Hillers, B, and Axel Graeser, "Real time Arc-Welding Video Observation System," 62nd International Conference of IIW, Jul. 12-17, 2009, Singapore, 2009.
Hillers, B., et al.; "Terebes: Welding Helmet with AR Capabilites," Institute of Automation, University of Bremen, and Institute of Industrial Engineering and Ergonomics, RWTH Aachen Universty, 2004.
Impact Welding: miscellaneous examples from current and archived website, trade shows, etc. See, e.g., http://www.impactwelding.com.
International Search Report from PCT application No. PCT/US2014/065498, dated May 11, 2015, 13 pgs.
International Search Report from PCT application No. PCT/US2014/065506, dated Jun. 26, 2015, 16 pgs.
International Search Report from PCT application No. PCT/US2014/065525, dated Jul. 23, 2015, 16 pgs.
International Search Report from PCT application No. PCT/US2015/037410, dated Nov. 6, 2015, 10 pgs.
International Search Report from PCT application No. PCT/US2015/037439, dated Nov. 3, 2015, 12 pgs.
International Search Report from PCT application No. PCT/US2015/037440, dated Nov. 3, 2015, 12 pgs.
International Search Report from PCT application No. PCT/US2015/039680, dated Sep. 23, 2015, 12 pgs.
International Search Report from PCT application No. PCT/US2015/043370, dated Dec. 4, 2015, 12 pgs.
Penrod, Matt; "New Welder Training Tools," EWI PowerPoint presentation, 2008.
Sandor, Christian, Gudrun Klinker; "Lessons Learned in Designing Ubiquitous Augmented Reality User Interfaces," Emerging Technologies of Augmented Reality Interfaces, Eds. Haller, M, Billinghurst, M., and Thomas, B., Idea Group Inc., 2006.
Terebes; miscellaneous examples from http://www.terebes.uni-bremen.de.
Tschurner, Petra, Hillers, Bernd, and Graeser, Axel; "A Concept for the Application of Augmented Realty in Manual Gas Metal Arc Welding," Proceedings of the International Symposium on Mixed and Augmented Reality, 2002.
Welding Journal, American Welding Society, Nov. 2007, https://app.aws.org/wj/2007/11/Wj_2007_11.pdf.
International Search Report for PCT application No. PCT/US2015/058563, dated Jan. 29, 2016, 13 pgs.
International Search Report from PCT application No. PCT/US2015/058569, dated Feb. 10, 2016, 12 pgs.
International Search Report from PCT application No. PCT/US2015/058660, dated Feb. 2, 2016, 14 pgs.
International Search Report from PCT application No. PCT/US2015/058666, dated Feb. 1, 2016, 11 pgs.
International Search Report from PCT application No. PCT/US2015/058667, dated Feb. 5, 2016, 14 pgs.
"Soldamatic: Augmented Training Technology for Welding," Seabery Augmented Training Technology, Seabery Soluciones, 2011.
Hashimoto, Nobuyoshi et al., "Training System for Manual Arc Welding by Using Mixed Reality: Reduction of Position-Perception Error of Electrode Tip," Journal of the Japan Society for Precision Engineering, vol. 72, pp. 249-253,2006.
International Search Report from PCT application No. PCT/US2014/018103, dated Jun. 30, 2014, 13 pgs.
International Search Report from PCT application No. PCT/US2015/058567, dated May 6, 2016, 15 pgs.
International Search Report from PCT application No. PCT/US2015/058664, dated Apr. 25, 2016, 17 pgs.
Kobayashi, Kazuhiko et al., "Modified Training System for Manual Arc Welding by Using Mixed Reality and Investigation of Its Effectiveness," Journal of the Japan Society for Precision Engineering, vol. 70, pp. 941-945, 2004.
Kobayashi, Kazuhiko et al., "Simulator of Manual Metal Arc Welding with Haptic Display," Chiba University, ICAT 2001, Dec. 2001.
Kobayashi, Kazuhiko et al., "Skill Training System of Manual Arc Welding by Means of Face-Shield HMD and Virtual Electrode," Chiba University, Japan, R. Nakatsu et al. (eds.), Entertainment Computing, Springer Science+Business Media, New York, 2003.
VRTEX 360, Lincoln Electric, Dec. 2009.
VRTEX 360 Operator's Manual, Lincoln Electric, Oct. 2012.
International Search Report from PCT application No. PCT/US2016/023612, dated Jul. 18, 2016, 11 pgs.
Hodgson, et al. "Virtual Reality in the Wild: A Self-Contained and Wearable Simulation System." IEEE Virtual Reality, Mar. 4-8, 2012, Orange County, Ca USA.

* cited by examiner

MULTI-MODE SOFTWARE AND METHOD FOR A WELDING TRAINING SYSTEM

BACKGROUND

The invention relates generally to welding and, more particularly, to a welding training system.

Welding is a process that has increasingly become utilized in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in appropriate amounts at the desired time.

In preparation for performing manual welding operations, welding operators may be trained using a welding training system. The welding training system may be designed to train welding operators with the proper techniques for performing various welding operations. Certain welding training systems may use various training methods. As may be appreciated, these training systems may be expensive to acquire and operate. Accordingly, welding training institutions may only acquire a limited number of such training systems. Furthermore, certain welding training systems may not adequately train welding operators to perform high quality welds.

BRIEF DESCRIPTION

In one embodiment, a welding training system includes a welding training software having three or more modes. The three or more modes include a live-arc mode, a simulation mode, a virtual reality mode, an augmented reality mode, or some combination thereof. The live-arc mode is configured to enable training using a live welding arc, the simulation mode is configured to enable training using a welding simulation, the virtual reality mode is configured to enable training using a virtual reality simulation, and the augmented reality mode is configured to enable training using an augmented reality simulation.

In another embodiment, a welding training software includes a virtual reality mode configured to enable training using a virtual reality simulation. The virtual reality simulation includes virtual objects that enable interaction between a welding operator and a selected virtual object of the virtual objects.

In a further embodiment, a method includes receiving, by welding training software in a computer, a first set of welding training data from a storage device. The first set of welding training data includes welding data corresponding to a first welding training assignment. The method also includes receiving, by the welding training software, a second set of welding training data from the storage device. The second set of welding training data includes welding data corresponding to a second welding training assignment. The method includes integrating, using the welding training software, the first set of welding training data with the second set of welding training data into a chart to enable a visual comparison of the first set of welding training data with the second set of welding training data. The method also includes providing the chart to a display device.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
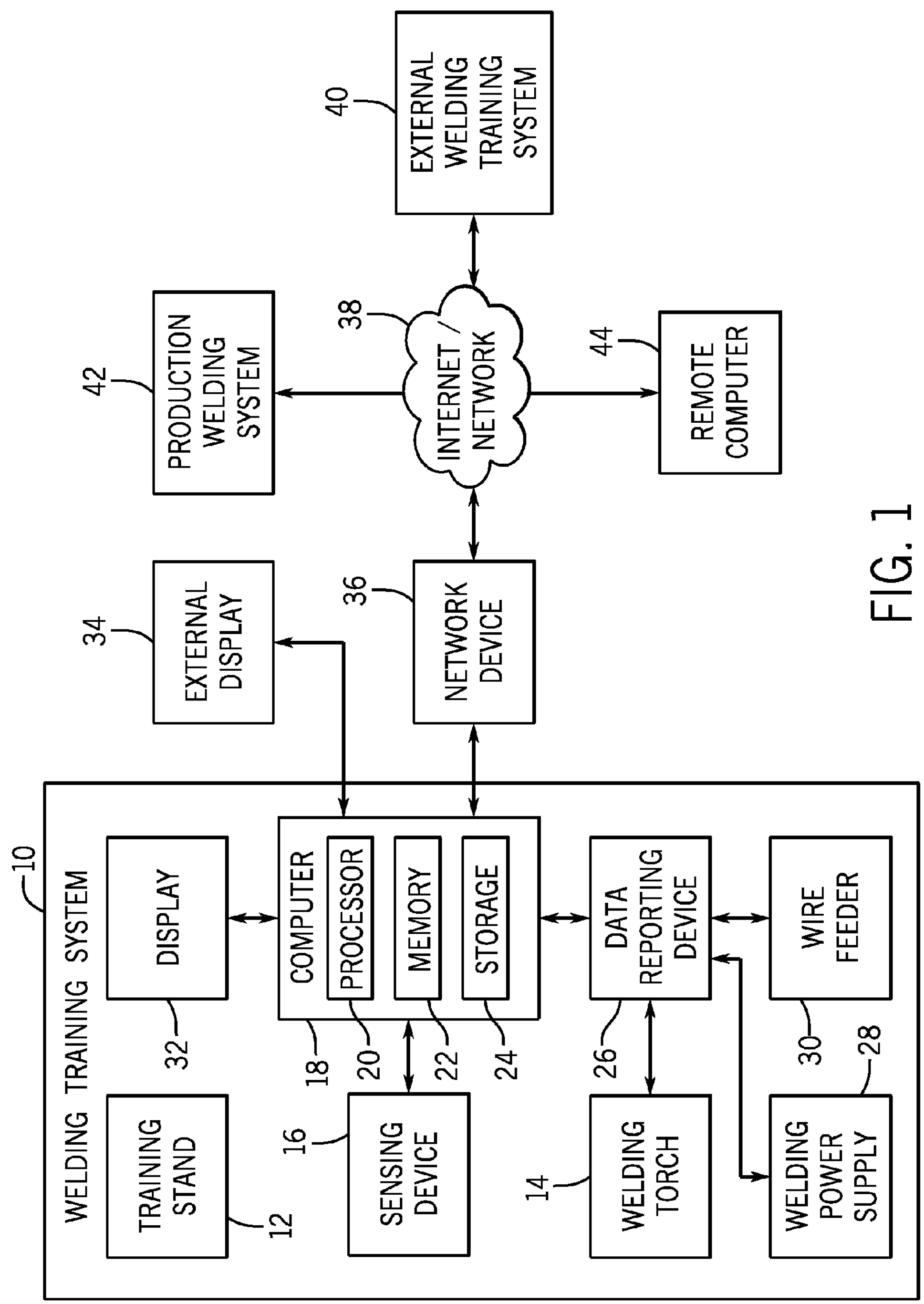
FIG. 1 is a block diagram of an embodiment of a welding training system in accordance with aspects of the present disclosure.

FIG. 1 is a block diagram of an embodiment of a welding training system 10. The welding training system 10 includes a training stand 12 for providing support for various training devices. For example, the training stand 12 may be configured to support a welding surface, a workpiece, a fixture, one or more training arms, and so forth. The welding training system 10 also includes a welding torch 14 that may be used by a welding operator (e.g., welding student) to perform training operations. As described in greater detail below, the welding torch 14 may be configured with a user interface configured to receive inputs from the welding operator, control circuitry configured to process the inputs, and a communication interface configured to provide the inputs to another device. Furthermore, the welding torch 14 may include one or more display and/or indicators to provide data to the welding operator. Moreover, the welding training system 10 includes a sensing device 16 (e.g., sensor, sensing assembly, and so forth) used to sense a position of one or more welding devices and/or to sense an orientation of one or more welding devices. For example, the sensing device 16 may be used to sense a position and/or an orientation of the training stand 12, the welding torch 14, a welding surface, a workpiece, a fixture, one or more training arms, and so forth. The sensing device 16 may include any suitable sensing device, such as a motion sensing device or a motion tracking device. Furthermore, the sensing device 16 may include one or more cameras, such as one or more infrared cameras, one or more visible spectrum cameras, one or more high dynamic range (HDR) cameras, and so forth.

The sensing device 16 is communicatively coupled to a computer 18. The sensing device 16 is configured to provide data (e.g., image data, sensed data, six degrees of freedom (6DOF) data, etc.) to the computer 18. Furthermore, the sensing device 16 may be configured to receive data (e.g., configuration data, setup data, commands, register settings, etc.) from the computer 18. The computer 18 includes one or more processors 20, memory devices 22, and storage devices 24. The processor(s) 20 may be used to execute software, such as welding training software, image processing software, sensing device software, and so forth. Moreover, the processor(s) 20 may include one or more microprocessors, such as one or more "general-purpose" microprocessors, one or more special-purpose microprocessors and/or application specific integrated circuits (ASICS), or some combination thereof. For example, the processor(s) 20 may include one or more reduced instruction set (RISC) processors.

The storage device(s) 24 (e.g., nonvolatile storage) may include ROM, flash memory, a hard drive, or any other suitable optical, magnetic, or solid-state storage medium, or a combination thereof. The storage device(s) 24 may store data (e.g., data corresponding to a training operation, video and/or parameter data corresponding to a training operation, etc.), instructions (e.g., software or firmware for the welding training system, the sensing device 16, etc.), and any other suitable data. As will be appreciated, data that corresponds to a training operation may include a video recording of the training operation, a simulated video, an orientation of the welding torch 14, a position of the welding torch 14, a work angle, a travel angle, a distance between a contact tip of the welding torch 14 and a workpiece, a travel speed, a proximity, a voltage, a current, a traversed path, a discontinuity analysis, welding device settings, and so forth.

The memory device(s) 22 may include a volatile memory, such as random access memory (RAM), and/or a nonvolatile memory, such as read-only memory (ROM). The memory device(s) 22 may store a variety of information and may be used for various purposes. For example, the memory device(s) 22 may store processor-executable instructions (e.g., firmware or software) for the processor(s) 20 to execute, such as instructions for a welding training simulation and/or for the sensing device 16. In addition, a variety of control regimes for various welding processes, along with associated settings and parameters may be stored in the storage device(s) 24 and/or memory device(s) 22, along with code configured to provide a specific output (e.g., initiate wire feed, enable gas flow, capture welding current data, detect short circuit parameters, determine amount of spatter, etc.) during operation.

As illustrated, the welding training system 10 includes a data reporting device 26; however, other embodiments may not include the data reporting device 26. The data reporting device 26 is configured to facilitate electronic communication between the computer 18, the welding torch 14, a welding power supply 28, and/or a wire feeder 30. For example, the data reporting device 26 may be configured to receive torch data from the welding torch 14, provide torch data to the computer 18, provide data to the welding torch 14, receive arc data from the wire feeder 30, provide arc data to the computer 18, and so forth. Furthermore, the data reporting device 26 may be configured to electronically communicate (e.g., either wired or wirelessly) with a device external to the welding training system 10. The welding power supply 28 may be used to provide welding power to a live-arc welding operation, and the wire feeder 30 may be used to provide welding wire to the live-arc welding operation.

The welding training system 10 includes a display 32 for displaying data and/or screens associated with welding training (e.g., to display data corresponding to a welding training software). For example, the display 32 may provide a graphical user interface to a welding operator (e.g., welding instructor, welding student). The graphical user interface may provide various screens to enable the welding instructor to organize a class, provide assignments to the class, analyze assignments performed by the class, provide assignments to an individual, analyze assignments performed by the individual, add, change, and/or delete parameters for a welding assignment, and so forth. Furthermore, the graphical user interface may provide various screens to enable a welding operator (e.g., welding student) to perform a welding training assignment, view results from prior welding assignments, and so forth. In certain embodiments, the display 32 may be a touch screen display configured to receive touch inputs, and to provide data corresponding to the touch inputs to the computer 18.

An external display 34 is coupled to the computer 18 to enable an individual located remotely from the welding training system 10 to view data corresponding to the welding training system 10. Furthermore, a network device 36 is coupled to the computer 18 to enable the computer 18 to communicate with other devices connected to the Internet or another network 38 (e.g., for providing test results to another device and/or for receiving test results from another device). For example, the network device 36 may enable the computer 18 to communicate with an external welding training system 40, a production welding system 42, and/or a remote computer 44. As may be appreciated, the welding training system 10 described herein may be used to train welding students in a cost effective manner. Furthermore, the welding training system 10 is configured to integrate real welding with simulated welding in a manner that prepares welding students for high quality production welding.

Welding Torch

Figure 2:
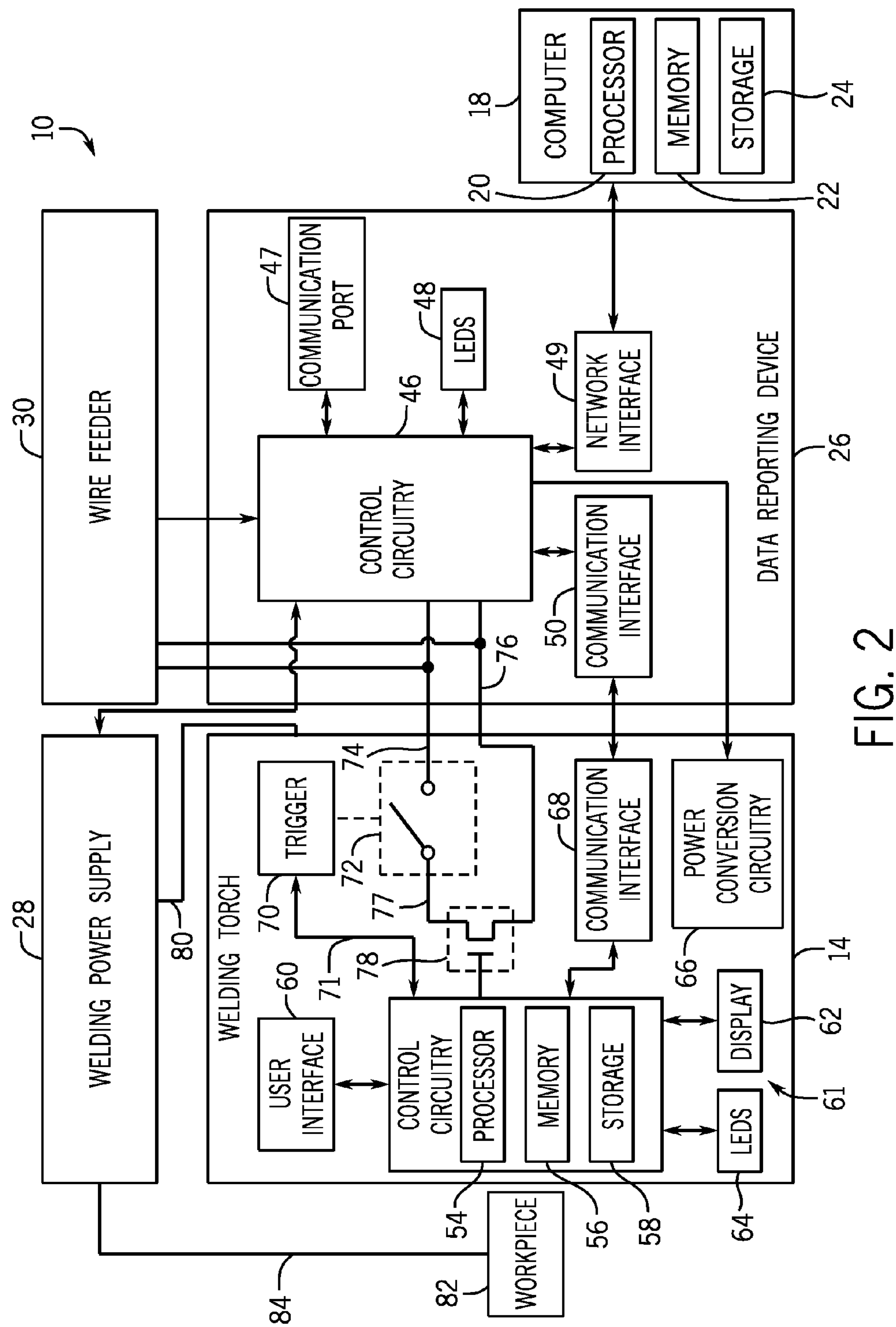
FIG. 2 is a block diagram of an embodiment of portions of the welding training system of FIG. 1 in accordance with aspects of the present disclosure.

FIG. 2 is a block diagram of an embodiment of portions of the welding training system 10 of FIG. 1. As illustrated, the data reporting device 26 includes control circuitry 46 configured to provide data to and/or to receive data from the wire feeder 30, the welding power supply 28, the welding torch 14, and the computer 18. The control circuitry 46 is also configured to provide power to one or more devices, such as the welding torch 14. The data reporting device 26 also includes a communication port 47 (e.g., universal serial bus (USB) port, a high speed serial bus port, etc.) and light emitting diodes (LEDs) 48 that may be used to indicate a status of the data reporting device 26, for example. The data reporting device 26 includes a network interface 49 to facilitate communication between the data reporting device 26 and an external device, such as the computer 18. The network interface 49 may be any suitable device that facilitates wired and/or wireless communication between the data reporting device 26 and the external device. The data reporting device 26 also includes a communication interface 50 to facilitate communication between the data reporting device 26 and the welding torch 14. In certain embodiments, the communication interface 50 may include an RS-232 driver.

The welding torch 14 includes control circuitry 52 configured to control the operation of the welding torch 14. In the illustrated embodiment, the control circuitry 52 includes one or more processors 54, memory devices 56, and storage devices 58. In other embodiments, the control circuitry 52 may not include the processors 54, the memory devices 56, and/or the storage devices 58. The processor(s) 54 may be used to execute software, such as welding torch software. Moreover, the processor(s) 54 may be similar to the processor(s) 20 described previously. Furthermore, the memory device(s) 56 may be similar to the memory device(s) 22, and the storage device(s) 58 may be similar to the storage device(s) 24.

The welding torch 14 includes a user interface 60 to enable a welding operator (e.g., welding student, welding instructor, etc.) to interact with the welding torch 14 and/or to provide inputs to the welding torch 14. For example, the user interface 60 may include buttons, switches, touch screens, touchpads, and so forth. The inputs provided to the welding torch 14 by the welding operator may be provided to the computer 18. For example, the inputs provided to the welding torch 14 may be used to control welding training software being executed by the computer 18. As such, the welding operator may use the user interface 60 on the welding torch 14 to navigate the welding training software screens, setup procedures, data analysis, welding courses, make selections within the welding training software, configure the welding training software, and so forth. Thus, the welding operator can use the welding torch 14 to control the welding training software (e.g., the welding operator does not have to put down the welding torch 14 to use a different input device). The welding torch 14 also includes visual indicators 61, such as a display 62 and LEDs 64. The visual indicators 61 may be configured to indicate or display data and/or images corresponding to a weld, welding training, and/or welding training software. For example, the visual indicators 61 may be configured to indicate a welding torch orientation, a welding torch travel speed, a welding torch position, a contact tip to workpiece distance, a proximity of the welding torch 14 in relation to the workpiece, an aim of the welding torch 14 (e.g., at what point the welding torch 14 is directed), training information for the welding operator, and so forth. Moreover, the visual indicators 61 may be configured to provide visual indications before a weld, during a weld, and/or after a weld. In certain embodiments, the LEDs 64 may illuminate to facilitate their detection by the sensing device 16. In such embodiments, the LEDs 64 may be positioned to enable the sensing device 16 to determine a position and/or an orientation of the welding torch 14 based on a spatial position of the LEDs 64.

In certain embodiments, the welding torch 14 includes power conversion circuitry 66 configured to receive power from the data reporting device 26 (e.g., or another device), and to convert the received power for powering the welding torch 14. In certain embodiments, the welding torch 14 may receive power that is already converted and/or does not utilize power conversion. Moreover, in some embodiments, the welding torch 14 may be powered by a battery or any suitable powering mechanism. The welding torch 14 also includes a communication interface 68 (e.g., RS-232 driver) to facilitate communication between the welding torch 14 and the data reporting device 26 (or another device). In the illustrated embodiment, the welding torch 14 may communicate with the computer 18 by providing data to the data reporting device 26 using the communication interfaces 50 and 68, then the data reporting device 26 communicates the data to the computer 18. Accordingly, inputs provided to the welding torch 14 may be provided to the computer 18. In certain embodiments, the welding torch 14 may provide inputs to the computer 18 by communicating directly with the computer 18.

The welding torch 14 includes a trigger 70 configured to mechanically actuate a trigger switch 72 between an open position (as illustrated) and a closed position. The trigger 70 provides a conductor 71 to carry a signal to the control circuitry 52 to indicate whether the trigger switch 72 is in the open position or the closed position. The wire feeder 30, the welding power supply 28, the computer 18, and/or the data reporting device 26 may determine whether there is continuity through the welding torch 14 across a first trigger conductor 74 and a second trigger conductor 76. The trigger switch 72 is electrically coupled between the first trigger conductor 74 and the second trigger conductor 76. Continuity across the first trigger conductor 74 and the second trigger conductor 76 may be determined by applying a voltage across the conductors 74 and 76, applying a current across the conductors 74 and 76, measuring a resistance across the conductors 74 and 76, and so forth. In certain embodiments, portions of the first trigger conductor 74 and/or portions of the second trigger conductor 76 may be disposed within a connector of the welding torch 14. Furthermore, in certain embodiments, the arrangement of switches and/or conductors within the welding torch 14 may be different than illustrated in FIG. 2.

The welding power supply 28 may determine whether to enable welding power to flow through the welding torch 14 based on whether there is continuity across the conductors 74 and 76. For example, the welding power supply 28 may enable welding power to flow through the welding torch 14 while there is continuity across the conductors 74 and 76, and the welding power supply 28 may block welding power from flowing through the welding torch 14 while there is an open circuit across the conductors 74 and 76. Furthermore, the wire feeder 30 may provide welding wire to the welding torch 14 while there is continuity across the conductors 74 and 76, and may block welding wire from being provided to the welding torch 14 while there is an open circuit across the conductors 74 and 76. Moreover, the computer 18 may use the continuity across the conductors 74 and 76 and/or the position of the trigger 70 or trigger switch 72 to start and/or stop a welding training operation, a welding training simulation, data recording, and so forth.

With the trigger switch 72 in the open position, there is an open circuit across the conductors 74 and 76, thus, the open position of the trigger switch 72 blocks electron flow between the conductors 74 and 76. Accordingly, the welding power supply 28 may block welding power from flowing through the welding torch 14 and the wire feeder 30 may block welding wire from being provided to the welding torch 14. Pressing the trigger 70 directs the trigger switch 72 to the closed position where the trigger switch 72 remains as long as the trigger 70 is pressed. With the trigger switch 72 in the closed position, there is continuity between the first trigger conductor 74 and a conductor 77 electrically connected to the trigger switch 72 and a training switch 78.

The training switch 78 is electrically coupled between the first trigger conductor 74 and the second trigger conductor 76. Moreover, the training switch 78 is electrically controlled by the control circuitry 52 to an open position or to a closed position. In certain embodiments, the training switch 78 may be any suitable electrically controlled switch, such as a transistor, relay, etc. The control circuitry 52 may selectively control the training switch 78 to the open position or to the closed position. For example, while welding training software of the welding training system 10 is operating in a live-arc mode, the control circuitry 52 may be configured to control the training switch 78 to the closed position to enable a live welding arc while the trigger 70 is pressed. In contrast, while welding training software of the welding training system 10 is operating in any mode other than the live-arc mode (e.g., simulation, virtual reality, augmented reality, etc.), the control circuitry 52 may be configured to control the training switch 78 to the open position to block a live welding arc (by blocking electron flow between the conductors 74 and 76).

In certain embodiments, the training switch 78 may default to the open position, thereby establishing an open circuit across the conductors 74 and 76. As may be appreciated, while the training switch 78 is in the open position, there will be an open circuit across the conductors 74 and 76 regardless of the position of the trigger switch 72 (e.g., electron flow between the conductors 74 and 76 is blocked by the open position of the training switch 78). However, while the training switch 78 is controlled to the closed position, and the trigger switch 72 is in the closed position, conductivity is established between the conductors 74 and 76 (e.g., electron flow between the conductors 74 and 76 is enabled). Accordingly, the welding power supply 28 may enable welding power to flow through the welding torch 14 only while the training switch 78 is in the closed position and while the trigger switch 72 is in the closed position. For example, welding power may flow from the welding power supply 28, through a weld cable 80, the welding torch 14, a workpiece 82, and return to the welding power supply 28 via a work cable 84 (e.g., electrode-negative, or straight polarity). Conversely, welding power may flow from the welding power supply 28, through the work cable 84, the workpiece 82, the welding torch 14, and return to the welding power supply 28 via the weld cable 80 (e.g., electrode-positive, or reverse polarity).

As may be appreciated, the training switch 78 may be physically located in any suitable portion of the welding training system 10, such as the data reporting device 26, the computer 18, and so forth. Furthermore, in certain embodiments, the functionality of the training switch 78 may be replaced by any suitable hardware and/or software in the welding training system 10.

Figure 2A:
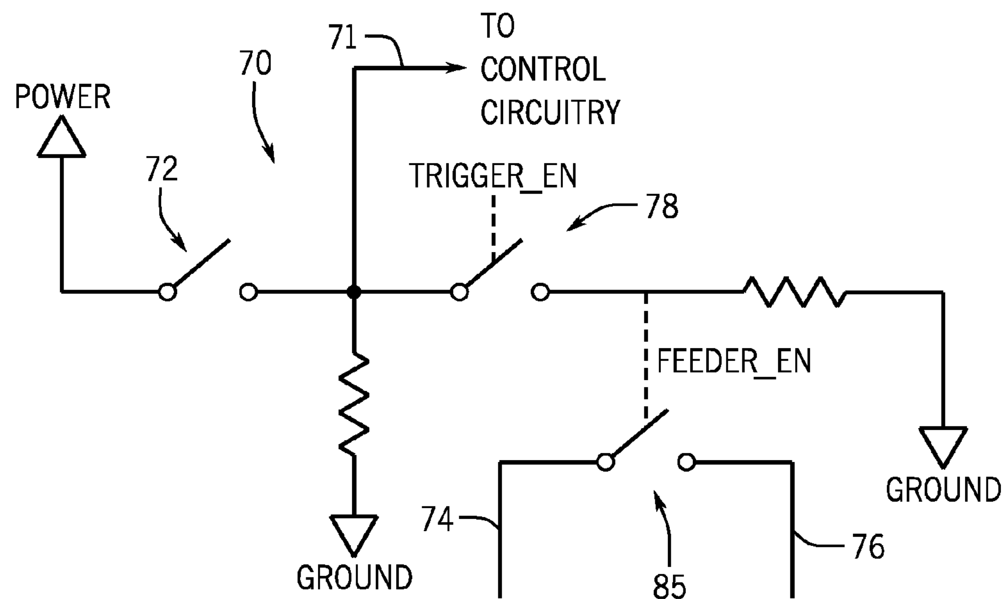
FIG. 2A is a schematic diagram of an embodiment of circuitry of the welding torch of FIG. 1 in accordance with aspects of the present disclosure.

FIG. 2A is a schematic diagram of an embodiment of circuitry of the welding torch 14 of FIG. 1. In the illustrated embodiment, the trigger switch 72 selectively connects a power supplying conductor (e.g., voltage source, etc.) to the conductor 71. Accordingly, while the trigger switch 72 is open, no voltage is applied to the conductor 71, and while the trigger switch 72 is closed, voltage from the power supplying conductor is supplied to the conductor 71. A trigger enable signal (e.g., TRIGGER_EN) may be provided by the control circuitry 52 to selectively control the training switch 78, and thereby control a feeder enable switch 85. For example, when the trigger enable signal controls the training switch 78 to an open position, no voltage is applied to the feeder enable switch 85 (e.g., via the FEEDER_EN connection), thereby maintaining the feeder enable switch 85 in the open position. Conversely, when the trigger enable signal controls the training switch 78 to a closed position, voltage is applied to the feeder enable switch 85, thereby controlling the feeder enable switch 85 to the closed position. With the feeder enable switch 85 in the closed position, conductivity between the conductors 74 and 76 is established. While one example of welding torch 14 circuitry is provided, any suitable circuitry may be used may be used within the welding torch 14.

Figure 3:
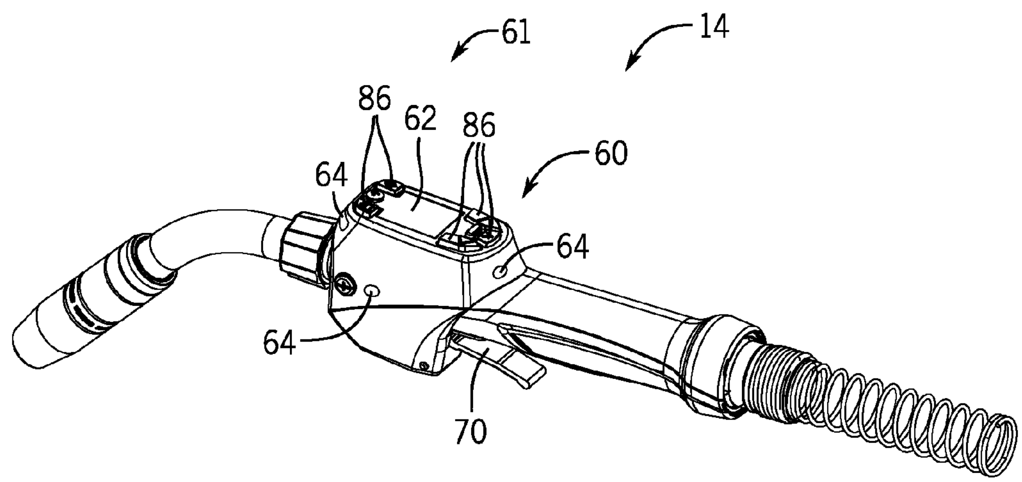
FIG. 3 is a perspective view of an embodiment of the welding torch of FIG. 1 in accordance with aspects of the present disclosure.

FIG. 3 is a perspective view of an embodiment of the welding torch 14 of FIGS. 1 and 2. As illustrated, the user interface 60 includes multiple buttons 86 which may be used to provide inputs to the welding torch 14. For example, the buttons 86 may enable a welding operator to navigate through welding training software. Furthermore, the welding torch 14 includes the display 62 which may show the welding operator data corresponding to the welding training software, data corresponding to a welding operation, and so forth. As illustrated, the LEDs 64 may be positioned at various locations on the welding torch 14. Accordingly, the LEDs 64 may be illuminated to facilitate detection by the sensing device 16.

Calibration Techniques

Figure 4:
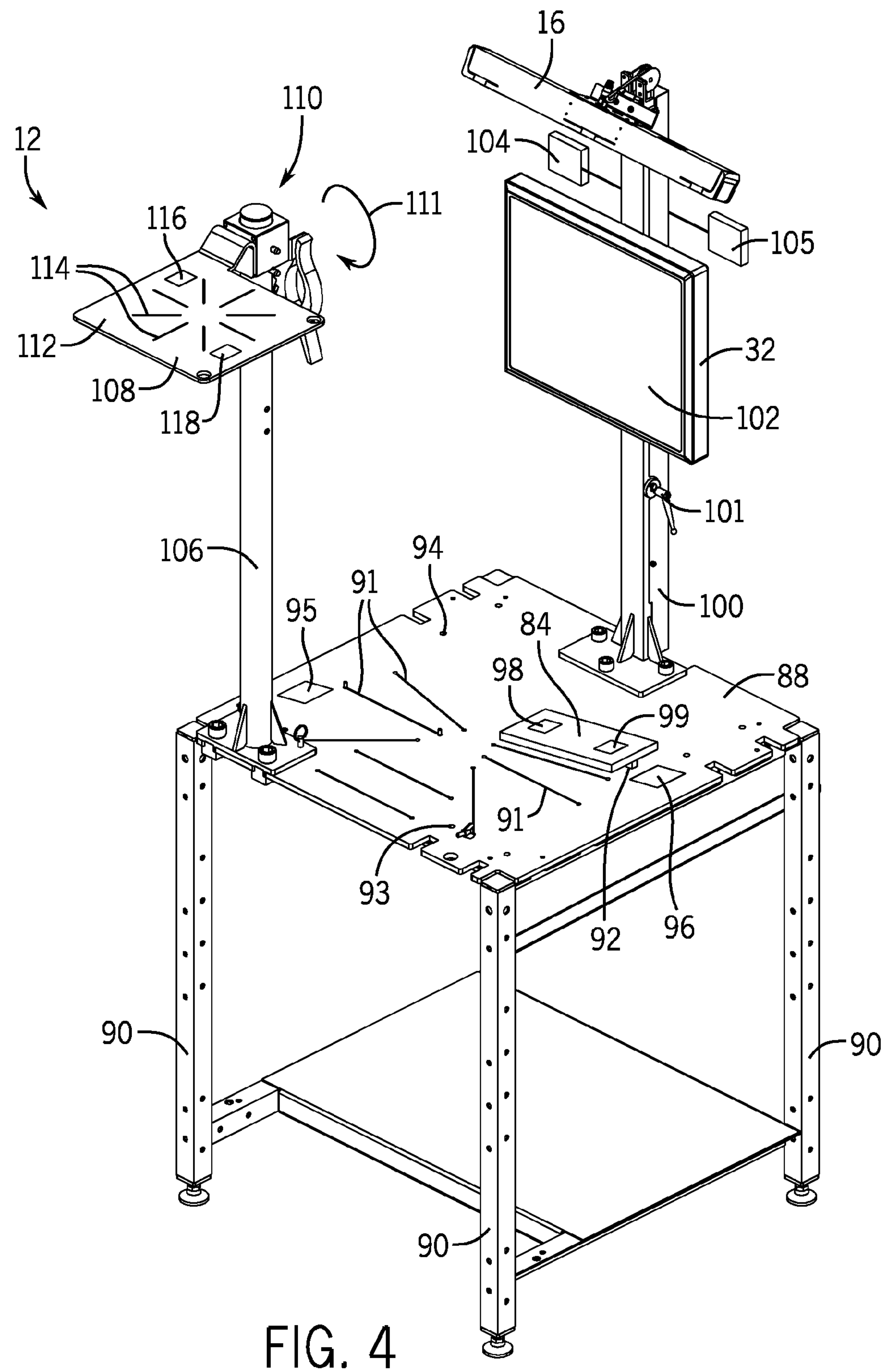
FIG. 4 is a perspective view of an embodiment of the training stand of FIG. 1 in accordance with aspects of the present disclosure.

FIG. 4 is a perspective view of an embodiment of the training stand 12 of FIG. 1. The training stand 12 includes a welding surface 88 on which live welds (e.g., real welds, actual welds) and/or simulated welds may be performed. Legs 90 provide support to the welding surface 88. The welding surface 88 includes slots 91 that may aid a welding operator in positioning and orienting the workpiece 84. In certain embodiments, the position and orientation of the workpiece 84 may be provided to welding training software of the welding training system 10 to calibrate the welding training system 10. For example, a welding operator may provide an indication to the welding training software identifying which slot 91 of the welding surface 88 the workpiece 84 is aligned with. Furthermore, a predefined welding training assignment may direct the welding operator to align the workpiece 84 with a particular slot 91. In certain embodiments, the workpiece 84 may include an extension 92 configured to extend into one or more of the slots 91 for alignment of the workpiece 84 with the one or more slots 91. As may be appreciated, each of the slots 91 may be positioned at a location corresponding to a respective location defined in the welding training software.

The welding surface 88 includes a first aperture 93 and a second aperture 94. The first and second apertures 93 and 94 may be used together to determine a position and/or an orientation of the welding surface 88. As may be appreciated, at least two apertures are used to determine the position and/or the orientation of the welding surface 88. In certain embodiments, more than two apertures may be used to determine the position and/or the orientation of the welding surface 88. The first and second apertures 93 and 94 may be positioned at any suitable location on the welding surface 88, and may be any suitable size. In certain embodiments, the position and/or orientation of the welding surface 88 relative to the sensing device 16 may be calibrated using the first and second apertures 93 and 94. For example, as described in greater detail below, a calibration device configured to be sensed by the sensing device 16 may be inserted into the first aperture 93, or touched to the first aperture 93. While the calibration device is inserted into, or touching, the first aperture 93, a user input provided to the welding training software (or other calibration software) may indicate that the calibration device is inserted into the first aperture 93. As a result, the welding training software may establish a correlation between a first data set (e.g., calibration data) received from the sensing device 16 (e.g., position and/or orientation data) at a first time and the location of first aperture 93. The calibration device may next be inserted into the second aperture 94, or touched to the second aperture 94. While the calibration device is inserted into, or touching, the second aperture 94, a user input provided to the welding training software may indicate that the calibration device is inserted into the second aperture 94. As a result, the welding training software may establish a correlation between a second data set (e.g., calibration data) received from the sensing device 16 at a second time and the location of second aperture 94. Thus, the welding training software may be able to calibrate the position and/or orientation of the welding surface 88 relative to the sensing device 16 using the first data set received at the first time and the second data set received at the second time.

The welding surface 88 also includes a first marker 95 and a second marker 96. The first and second markers 95 and 96 may be used together to determine a position and/or an orientation of the welding surface 88. As may be appreciated, at least two markers are used to determine the position and/or the orientation of the welding surface 88. In certain embodiments, more than two markers may be used to determine the position and/or the orientation of the welding surface 88. The first and second markers 95 and 96 may be formed from any suitable material. Moreover, in certain embodiments, the first and second markers 95 and 96 may be built into the welding surface 88, while in other embodiments, the first and second markers 95 and 96 may be attached to the welding surface 88. For example, the first and second markers 95 and 96 may be attached to the welding surface 88 using an adhesive and/or the first and second markers 95 and 96 may be stickers. The first and second markers 95 and 96 may have any suitable shape, size, and/or color. Furthermore, in certain embodiments, the first and second markers 95 and 96 may be a reflector formed from a reflective material. The first and second markers 95 and 96 may be used by the welding training system 10 to calibrate the position and/or orientation of the welding surface 88 relative to the sensing device 16 without a separate calibration device. Accordingly, the first and second markers 95 and 96 are configured to be detected by the sensing device 16. In certain embodiments, the first and second markers 95 and 96 may be positioned at predetermined locations on the welding surface 88. Furthermore, the welding training software may be programmed to use the predetermined locations to determine the position and/or the orientation of the welding surface 88. In other embodiments, the location of the first and second markers 95 and 96 may be provided to the welding training software during calibration. With the first and second markers 95 and 96 on the welding surface 88, the sensing device 16 may sense the position and/or orientation of the first and second markers 95 and 96 relative to the sensing device 16. Using this sensed data in conjunction with the location of the first and second markers 95 and 96 on the welding surface 88, the welding training software may be able to calibrate the position and/or orientation of the welding surface 88 relative to the sensing device 16.

In the illustrated embodiment, the workpiece 84 includes a first marker 98 and a second marker 99. The first and second markers 98 and 99 may be used together to determine a position and/or an orientation of the workpiece 84. As may be appreciated, at least two markers are used to determine the position and/or the orientation of the workpiece 84. In certain embodiments, more than two markers may be used to determine the position and/or the orientation of the workpiece 84. The first and second markers 98 and 99 may be formed from any suitable material. Moreover, in certain embodiments, the first and second markers 98 and 99 may be built into the workpiece 84, while in other embodiments, the first and second markers 98 and 99 may be attached to the workpiece 84. For example, the first and second markers 98 and 99 may be attached to the workpiece 84 using an adhesive and/or the first and second markers 98 and 99 may be stickers. The first and second markers 98 and 99 may have any suitable shape, size, and/or color. Furthermore, in certain embodiments, the first and second markers 98 and 99 may be a reflector formed from a reflective material. The first and second markers 98 and 99 may be used by the welding training system 10 to calibrate the position and/or orientation of the workpiece 84 relative to the sensing device 16 without a separate calibration device. Accordingly, the first and second markers 98 and 99 are configured to be detected by the sensing device 16. In certain embodiments, the first and second markers 98 and 99 may be positioned at predetermined locations on the workpiece 84. Furthermore, the welding training software may be programmed to use the predetermined locations to determine the position and/or the orientation of the workpiece 84. In other embodiments, the location of the first and second markers 98 and 99 may be provided to the welding training software during calibration. With the first and second markers 98 and 99 on the workpiece 84, the sensing device 16 may sense the position and/or orientation of the first and second markers 98 and 99 relative to the sensing device 16. Using this sensed data in conjunction with the location of the first and second markers 98 and 99 on the workpiece 84, the welding training software may be able to calibrate the position and/or orientation of the workpiece 84 relative to the sensing device 16. While the markers 95, 96, 98, and 99 have been described herein as being detected by the sensing device 16, in certain embodiments, the markers 95, 96, 98, and 99 may indicate locations where a calibration device is to be touched for calibration using the calibration device, as described previously.

The training stand 12 includes a first arm 100 extending vertically from the welding surface 88 and configured to provide support for the sensing device 16 and the display 32. A knob 101 is attached to the first arm 100 and may be used to adjust an orientation of the sensing device 16 relative to the first arm 100. For example, as the knob 101 is adjusted, mechanical components extending through the first arm 100 may adjust an angle of the sensing device 16. The display 32 includes a cover 102 to protect the display 32 from welding emissions that may occur during a live welding operation. The cover 102 may be made from any suitable material, such as a transparent material, a polymer, and so forth. By using a transparent material, a welding operator may view the display 32 while the cover 102 is positioned in front of the display 32, such as before, during, and/or after a welding operation. A camera 104 may be coupled to the first arm 100 for recording welding operations. In certain embodiments, the camera 104 may be a high dynamic range (HDR) camera. Furthermore, an emitter 105 may be coupled to the first arm 100. The emitter 105 may be used to calibrate the position and/or orientation of the welding surface 88 relative to the sensing device 16. For example, the emitter 105 may be configured to emit a visible pattern onto the welding surface 88. The visible pattern may be shown onto the welding surface 88. Furthermore, the visible pattern may be detected by the sensing device 16 to calibrate the position and/or the orientation of the welding surface 88 relative to the sensing device 16. For example, based on particular features of the visible pattern alignments and/or orientations may be determined by the sensing device 16 and/or the welding training software. Moreover, the visible pattern emitted by the emitter 105 may be used to facilitate positioning of the workpiece 84 on the welding surface 88.

The training stand 12 also includes a second arm 106 extending vertically from the welding surface 88 and configured to provide support for an overhead welding plate 108. The second arm 106 may be adjustable to facilitate overhead welding at different heights. Moreover, the second arm 106 may be manufactured in a number of different ways to facilitate overhead welding at different heights. The overhead welding plate 108 is coupled to the second arm 106 using a mounting assembly 110. The mounting assembly 110 facilitates rotation of the overhead welding plate 108 as illustrated by arrow 111. For example, the overhead welding plate 108 may be rotated from extending generally in the horizontal plane (e.g., for overhead welding), as illustrated, to extend generally in the vertical plane (e.g., for vertical welding). The overhead welding plate 108 includes a welding surface 112. The welding surface 112 includes slots 114 that may aid a welding operator in positioning the workpiece 84 on the welding surface 112, similar to the slots 91 on the welding surface 88. In certain embodiments, the position of the workpiece 84 may be provided to welding training software of the welding training system 10 to calibrate the welding training system 10. For example, a welding operator may provide an indication to the welding training software identifying which slot 114 of the welding surface 112 the workpiece 84 is aligned with. Furthermore, a predefined welding training assignment may direct the welding operator to align the workpiece 84 with a particular slot 114. In certain embodiments, the workpiece 84 may include an extension configured to extend into one or more of the slots 114 for alignment of the workpiece 84 with the one or more slots 114. As may be appreciated, each of the slots 114 may be positioned at a location corresponding to a respective location defined in the welding training software.

The welding surface 112 also includes a first marker 116 and a second marker 118. The first and second markers 116 and 118 may be used together to determine a position and/or an orientation of the welding surface 112. As may be appreciated, at least two markers are used to determine the position and/or the orientation of the welding surface 112. In certain embodiments, more than two markers may be used to determine the position and/or the orientation of the welding surface 112. The first and second markers 116 and 118 may be formed from any suitable material. Moreover, in certain embodiments, the first and second markers 116 and 118 may be built into the welding surface 112 (or another part of the overhead welding plate 108), while in other embodiments, the first and second markers 116 and 118 may be attached to the welding surface 112 (or another part of the overhead welding plate 108). For example, the first and second markers 116 and 118 may be attached to the welding surface 112 using an adhesive and/or the first and second markers 116 and 118 may be stickers. The first and second markers 116 and 118 may have any suitable shape, size, and/or color. Furthermore, in certain embodiments, the first and second markers 116 and 118 may be a reflector formed from a reflective material. The first and second markers 116 and 118 may be used by the welding training system 10 to calibrate the position and/or orientation of the welding surface 112 relative to the sensing device 16 without a separate calibration device. Accordingly, the first and second markers 116 and 118 are configured to be detected by the sensing device 16. In certain embodiments, the first and second markers 116 and 118 may be positioned at predetermined locations on the welding surface 112. Furthermore, the welding training software may be programmed to use the predetermined locations to determine the position and/or the orientation of the welding surface 112. In other embodiments, the location of the first and second markers 116 and 118 may be provided to the welding training software during calibration. With the first and second markers 116 and 118 on the welding surface 112, the sensing device 16 may sense the position and/or orientation of the first and second markers 116 and 118 relative to the sensing device 16. Using this sensed data in conjunction with the location of the first and second markers 116 and 118 on the welding surface 112, the welding training software may be able to calibrate the position and/or orientation of the welding surface 112 relative to the sensing device 16. Furthermore, the sensing device 16 may sense and/or track the first and second markers 116 and 118 during a weld to account for any movement of the overhead welding plate 108 that may occur during the weld. While the markers 116 and 118 have been described herein as being detected by the sensing device 16, in certain embodiments, the markers 116 and 118 may indicate locations where a calibration device is to be touched or inserted for calibration using the calibration device, as described previously.

Figure 5:
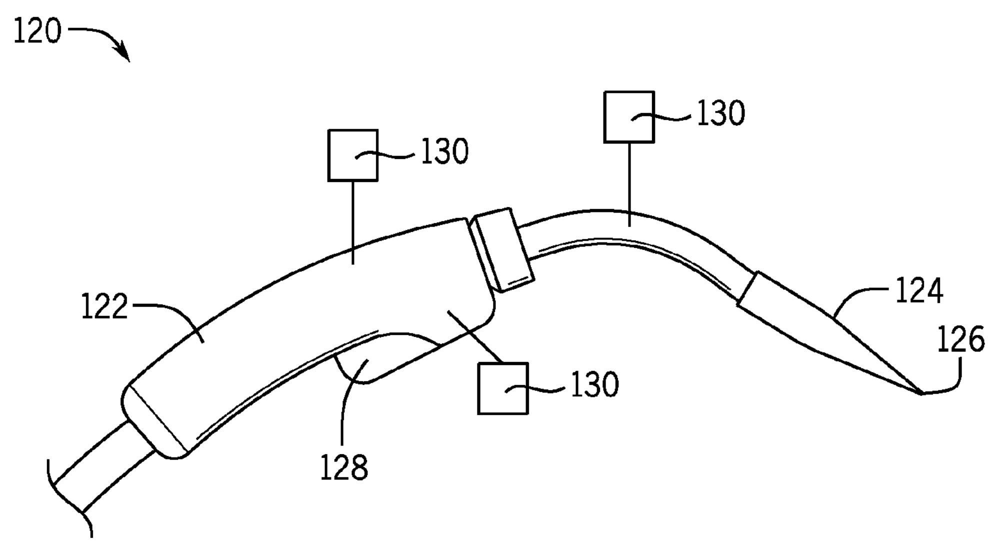
FIG. 5 is a perspective view of an embodiment of a calibration device in accordance with aspects of the present disclosure.

FIG. 5 is a perspective view of an embodiment of a calibration device 120. The calibration device 120 is shaped like a torch and may be used for calibrating the position and/or orientation of the welding surfaces 88 and 112 relative to the sensing device 16, as described in greater detail above. The calibration device 120 includes a handle 122 and a nozzle 124. The nozzle 124 includes a pointed end 126 that may be used to touch a location for calibration and/or to be inserted into an aperture for calibration. The calibration device 120 also includes a user interface 128 that enables the welding operator to provide input corresponding to a time that the calibration device 120 is touching a location for calibration and/or is being inserted into an aperture for calibration. Moreover, in certain embodiments, the calibration device 120 includes markers 130 configured to be sensed by the sensing device 16. As illustrate, the markers 130 extend from the calibration device 120. However, in other embodiments, the markers 130 may not extend from the calibration device 120. The markers 130 may be any suitable marker configured to be detected by the sensing device 16. Moreover, the markers 130 may be any suitable size, shape, and/or color.

During calibration, the sensing device 16 may sense a position of the calibration device 120 and/or an orientation of the calibration device 120. The position and/or orientation of the calibration device 120 may be used by the welding training software to determine a position and/or orientation of one or more of the welding surfaces 88 and 112 relative to the sensing device 16, a position and/or orientation of the workpiece 84 relative to the sensing device 16, a position and/or orientation of a fixture relative to the sensing device 16, and so forth. Thus, the calibration device 120 may facilitate calibration of the welding training system 10.

Figure 6:
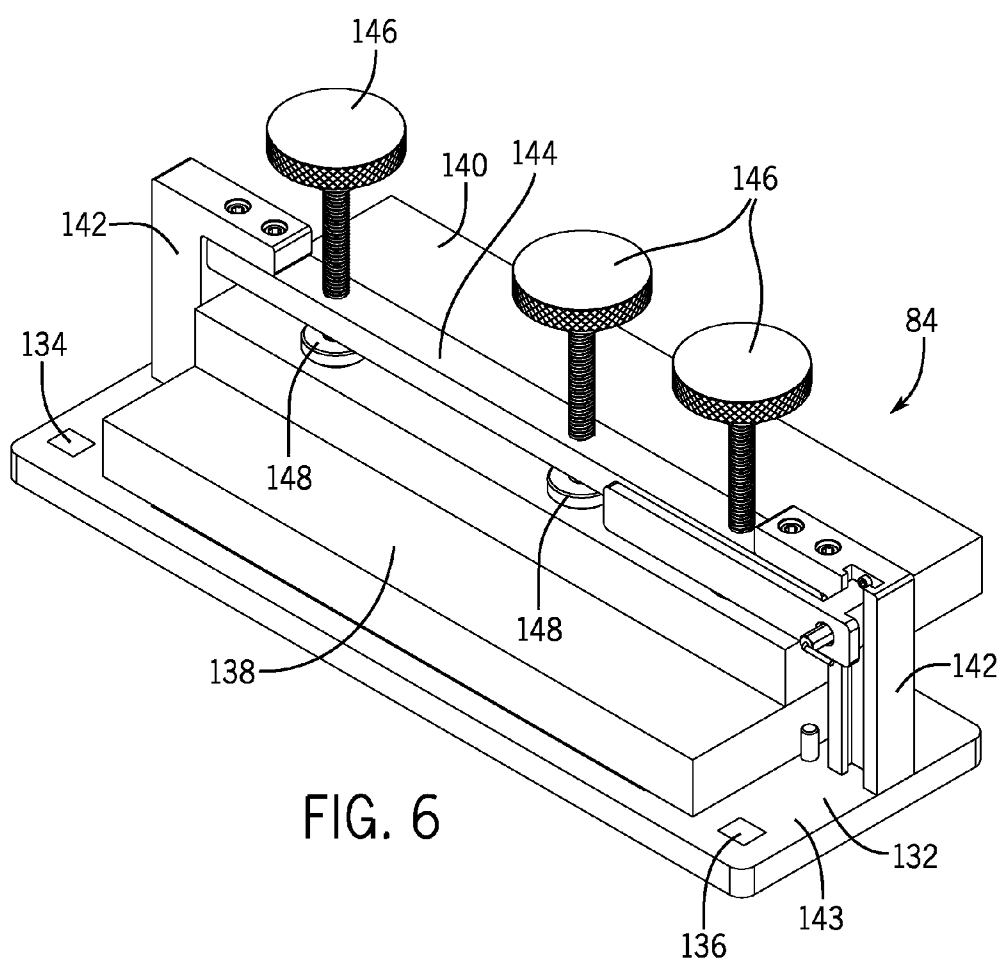
FIG. 6 is a perspective view of an embodiment of a fixture assembly in accordance with aspects of the present disclosure.

FIG. 6 is a perspective view of an embodiment of a fixture assembly 132. The fixture assembly 132 may be positioned on the welding surface 88 and/or the welding surface 112, and may secure the workpiece 84 thereon. In certain embodiments, the fixture assembly 132 may be configured to align with one or more of the slots 92 and 114. In other embodiments, the fixture assembly 132 may be placed at any location on the welding surface 88 and/or the welding surface 122. The fixture assembly 132 also includes a first marker 134 and a second marker 136. The first and second markers 134 and 136 may be used together to determine a position and/or an orientation of the fixture assembly 132. As may be appreciated, at least two markers are used to determine the position and/or the orientation of the fixture assembly 132. The first and second markers 134 and 136 may be formed from any suitable material. Moreover, in certain embodiments, the first and second markers 134 and 136 may be built into the fixture assembly 132, while in other embodiments, the first and second markers 134 and 136 may be attached to the fixture assembly 132. For example, the first and second markers 134 and 136 may be attached to the fixture assembly 132 using an adhesive and/or the first and second markers 134 and 136 may be stickers. The first and second markers 134 and 136 may have any suitable shape, size, and/or color. Furthermore, in certain embodiments, the first and second markers 134 and 136 may be a reflector formed from a reflective material. The first and second markers 134 and 136 may be used by the welding training system 10 to calibrate the position and/or orientation of the fixture assembly 132 relative to the sensing device 16 without a separate calibration device. Accordingly, the first and second markers 134 and 136 are configured to be detected by the sensing device 16. In certain embodiments, the first and second markers 134 and 136 may be positioned at predetermined locations on the fixture assembly 132. Furthermore, the welding training software may be programmed to use the predetermined locations to determine the position and/or the orientation of the fixture assembly 132. In other embodiments, the location of the first and second markers 134 and 136 may be provided to the welding training software during calibration. With the first and second markers 134 and 136 on the fixture assembly 132, the sensing device 16 may sense the position and/or orientation of the first and second markers 134 and 136 relative to the sensing device 16. Using this sensed data in conjunction with the location of the first and second markers 134 and 136 on the fixture assembly 132, the welding training software may be able to calibrate the position and/or orientation of the fixture assembly 132 relative to the sensing device 16. While the first and second markers 134 and 136 have been described herein as being detected by the sensing device 16, in certain embodiments, the first and second markers 134 and 136 may indicate locations where a calibration device is to be touched or inserted for calibration using the calibration device 120, as described previously.

In the illustrated embodiment, the fixture assembly 132 is configured to secure a lower portion 138 of the workpiece 84 to an upper portion 140 of the workpiece 84 for performing a lap weld. In other embodiments, the fixture assembly 132 may be configured to secure portions of the workpiece 84 for performing a butt weld, a fillet weld, and so forth, to aid a welding operator in performing a weld. The fixture assembly 132 includes vertical arms 142 extending from a base 143. A cross bar 144 extends between the vertical arms 142, and is secured to the vertical arms 142. Adjustment mechanisms 146 (e.g., knobs) may be adjusted to direct locking devices 148 toward the workpiece 84 for securing the workpiece 84 between the locking devices 148 and the base 143 of the fixture assembly 132. Conversely, the adjustment mechanisms 146 may be adjusted to direct the locking devices 148 away from the workpiece 84 for removing the workpiece 84 from being between the locking devices 148 and the base 143. Accordingly, the workpiece 84 may be selectively secured to the fixture assembly 132.

Welding Training System Devices

Figure 7:
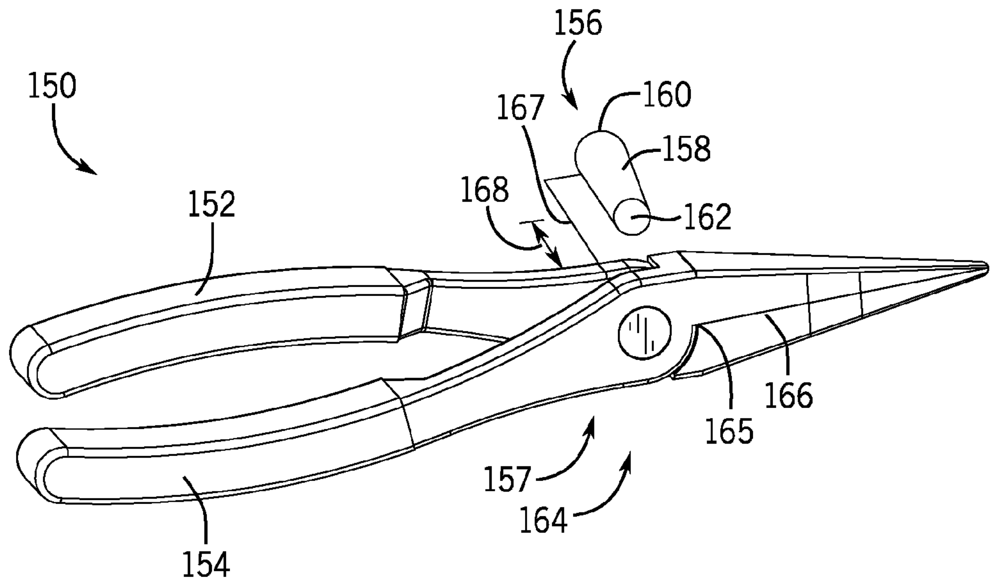
FIG. 7 is a perspective view of a welding wire stickout calibration tool in accordance with aspects of the present disclosure.

FIG. 7 is a perspective view of a welding wire stickout calibration tool 150. The tool 150 is configured to calibrate a length of welding wire extending out of a torch nozzle to a selectable length. Accordingly, the tool 150 includes a first handle 152 and a second handle 154. The tool 150 also includes a torch nozzle holder 156 attached to a central portion 157 of the tool 150 and extending outward from the central portion 157 a selected distance. In the illustrated embodiment, the torch nozzle holder 156 has a generally cylindrical body 158 (e.g., cup shape); however, in other embodiments, the body 158 of the torch nozzle holder 156 may have any suitable shape. Moreover, the torch nozzle holder 156 is configured to receive the torch nozzle through a nozzle inlet 160 such that the torch nozzle extends into the body 158. Furthermore, the torch nozzle holder 156 includes an opening 162 configured to enable welding wire to extend out the end of the torch nozzle holder 156, and to block the torch nozzle from extending through the opening 162. As the torch nozzle extends into the torch nozzle holder 156, the welding wire extends out of the opening 162 of the torch nozzle holder 156 toward a blade assembly 164 of the tool 150. The blade assembly 164 includes one or more sides 165 and 166 configured to contact the welding wire. In certain embodiments, both of sides 165 and 166 include blades to cut opposing sides of the welding wire, while in other embodiments, only one of the sides 165 and 166 includes a blade to cut one side of the welding wire and the other side includes a surface to which the blade is directed toward. For calibrating the length of the welding wire, the welding wire may extend through the opening 162 and into the blade assembly 164. The welding wire may be cut to a selectable length by pressing the first handle 152 and the second handle 154 toward one another, thereby calibrating the length of wire extending from the torch nozzle. The calibration length may be selected using an adjustment mechanism 167 to adjust a distance 168 between the blade assembly 164 and the opening 162 of the torch nozzle holder 156. Thus, using the tool 150, the length of wire extending from the torch nozzle may be calibrated.

Figure 8:
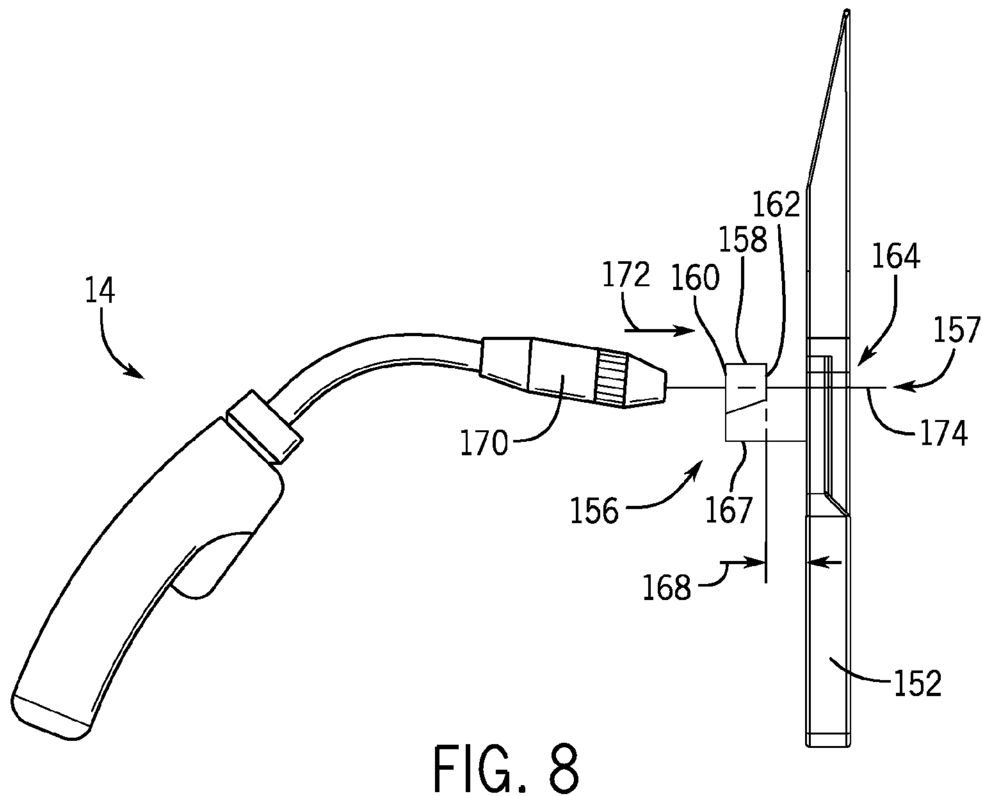
FIG. 8 is a top view of the welding wire stickout calibration tool of FIG. 7 in accordance with aspects of the present disclosure.

FIG. 8 is a top view of the welding wire stickout calibration tool 150 of FIG. 7. As illustrated, the welding torch 14 may be used with the tool 150. Specifically, a nozzle 170 of the welding torch 14 may be inserted into the torch nozzle holder 156 in a direction 172. Welding wire 174 extending from the welding torch 14 is directed through the nozzle inlet 160, the opening 162, and the blade assembly 164. Accordingly, the first and second handles 152 and 154 may be pressed together to cut the welding wire 174 to the distance 168 (e.g., the calibration length) set by the adjustment mechanism 167.

Figure 9:
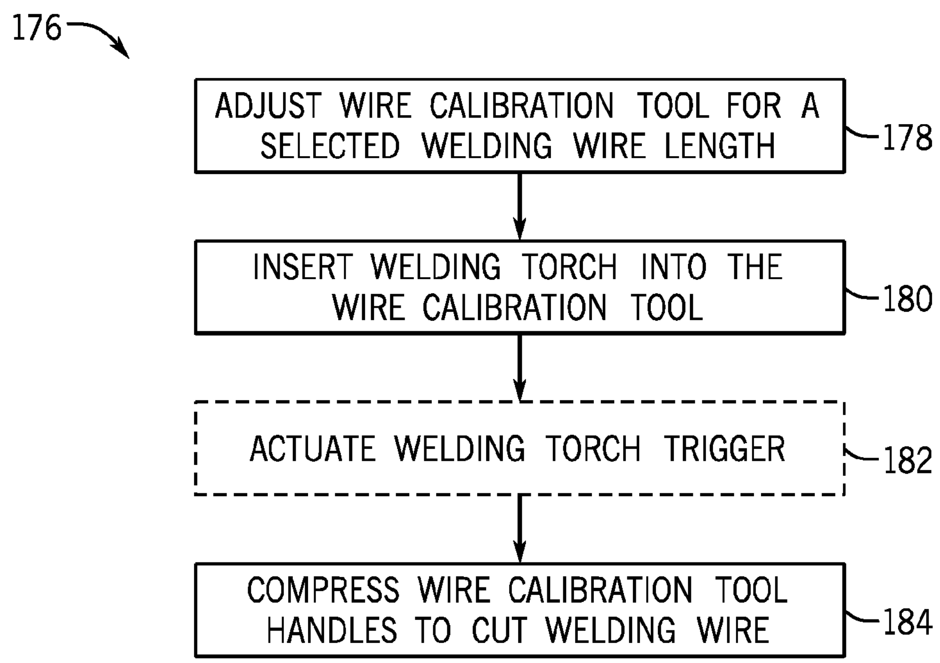
FIG. 9 is an embodiment of a method for calibrating wire stickout from a welding torch in accordance with aspects of the present disclosure.

FIG. 9 is an embodiment of a method 176 for calibrating wire stickout from the welding torch 14. The tool 150 may be used to calibrate the length of welding wire 174 extending from the nozzle 170 using a variety of methods. In the method 176, the adjustment mechanism 167 of the welding wire stickout calibration tool 150 may be adjusted for a selected welding wire 174 length (block 178). For example, the distance 168 of the torch nozzle holder 156 from the tool 150 may be set to a range of between approximately 0.5 to 2.0 cm, 1.0 to 3.0 cm, and so forth. The welding torch 14 may be inserted into the torch nozzle holder 156 of the tool 150, such that the nozzle 170 of the welding torch 14 abuts the torch nozzle holder 156, and that the welding wire 174 extends through the opening 162 of the torch nozzle holder 156 (block 180). In certain embodiments, the welding wire 174 may be long enough to extend through the blade assembly 164. However, if the welding wire 174 does not extend through the blade assembly 164, a welding operator may actuate the trigger 70 of the welding torch 14 to feed welding wire 174 such that the welding wire 174 extends through the blade assembly 164 (block 182). Accordingly, the welding operator may compress handles 152 and 154 of the tool 150 to cut the welding wire 174 extending through the blade assembly 164 and thereby calibrate the length of the welding wire 174 (block 184).

Figure 10:
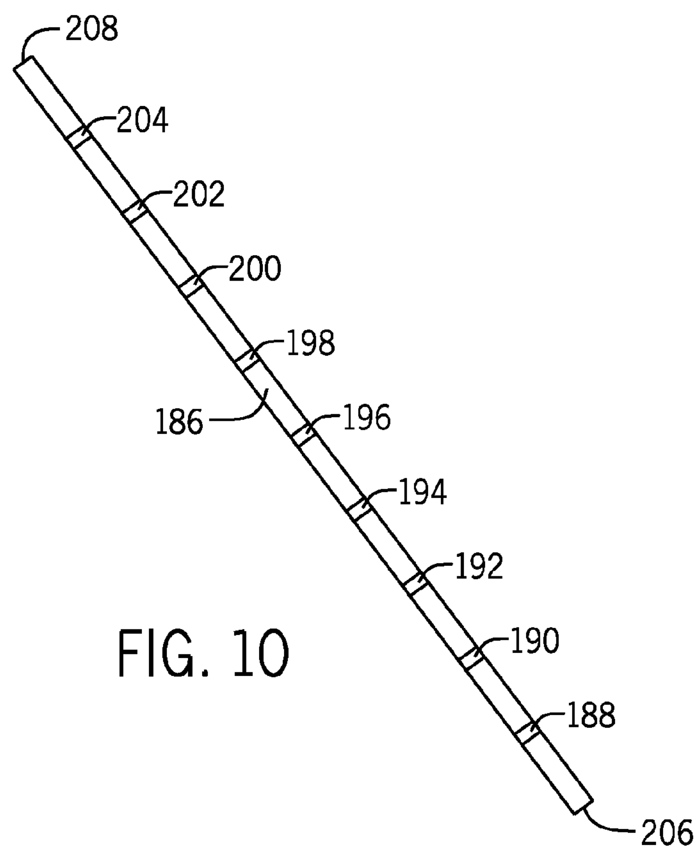
FIG. 10 is a perspective view of an embodiment of a welding consumable having physical marks in accordance with aspects of the present disclosure.

FIG. 10 is a perspective view of an embodiment of a welding consumable 186 having physical marks. The welding consumable 186 may be any suitable welding consumable, such as a welding stick, welding rod, or a welding electrode. The welding consumable 186 includes physical marks 188, 190, 192, 194, 196, 198, 200, 202, and 204. The physical marks 188, 190, 192, 194, 196, 198, 200, 202, and 204 may be any suitable physical mark. For example, the physical marks 188, 190, 192, 194, 196, 198, 200, 202, and 204 may include a bar code, an image, a shape, a color, text, a set of data, and so forth. In certain embodiments, the physical marks 188, 190, 192, 194, 196, 198, 200, 202, and 204 may be laser etched. Furthermore, in certain embodiments, the physical marks 188, 190, 192, 194, 196, 198, 200, 202, and 204 may be visible with the natural eye (e.g., within the visible spectrum), while in other embodiments the physical marks 188, 190, 192, 194, 196, 198, 200, 202, and 204 may not be visible with the natural eye (e.g., not within the visible spectrum).

Each of the physical marks 188, 190, 192, 194, 196, 198, 200, 202, and 204 indicates a location on the welding consumable 186 relative to either a first end 206, or a second end 208 of the welding consumable 186. For example, the physical mark 188 may indicate a distance from the first end 206, a distance from the second end 208, or some other location relative to the welding consumable 186. In certain embodiments, the physical marks 188, 190, 192, 194, 196, 198, 200, 202, and 204 may indicate a number that corresponds to the first end 206 and/or the second end 208. For example, the physical mark 188 may indicate a number "1" indicating that it is the first physical mark from the first end 206 and/or the physical mark 188 may indicate a number "9" indicating that it is the ninth physical mark from the second end 208. A processing device may use a lookup table to determine a distance from the first end 206 or the second end 208 based on the number indicated by the physical mark.

A camera-based detection system, which may include the sensing device 16, or another type of system is configured to detect the physical marks 188, 190, 192, 194, 196, 198, 200, 202, and 204 during live arc welding or a welding simulation. Moreover, the camera-based detection system is configured to determine a remaining length of the welding consumable 186, a consumed length of the welding consumable 186, a rate of use of the welding consumable 186, a dipping rate of the welding consumable 186, and so forth, based on the detected physical marks. Accordingly, data corresponding to use of the welding consumable 186 may be tracked by the welding training system 10 for training and/or analysis.

Figure 11:
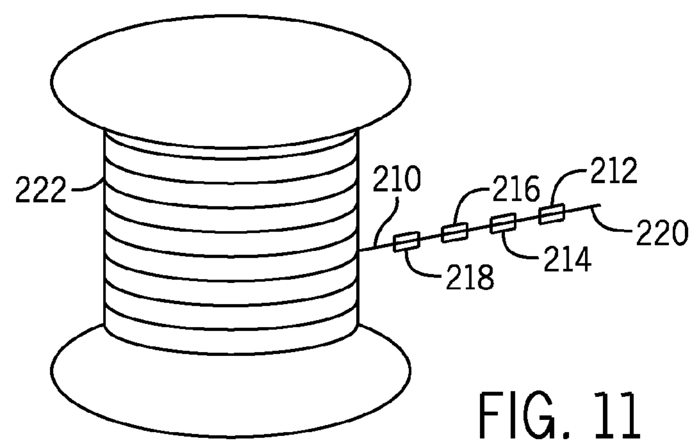
FIG. 11 is a perspective view of an embodiment of welding wire having physical marks in accordance with aspects of the present disclosure.

FIG. 11 is a perspective view of an embodiment of welding wire 210 having physical marks 212, 214, 216, and 218. The physical marks 212, 214, 216, and 218 may be any suitable physical mark. For example, the physical marks 212, 214, 216, and 218 may include a bar code, an image, a shape, text, a set of data, and so forth. In certain embodiments, the physical marks 212, 214, 216, and 218 may be laser etched. Furthermore, in certain embodiments, the physical marks 212, 214, 216, and 218 may be visible with the natural eye (e.g., within the visible spectrum), while in other embodiments the physical marks 212, 214, 216, and 218 may not be visible with the natural eye (e.g., not within the visible spectrum).

Each of the physical marks 212, 214, 216, and 218 indicates a location on the welding wire 210 relative to either a first end 220, or a second end 222 of the welding wire 210. For example, the physical mark 212 may indicate a distance from the first end 220, a distance from the second end 222, or some other location relative to the welding wire 210. In certain embodiments, the physical marks 212, 214, 216, and 218 may indicate a number that corresponds to the first end 220 and/or the second end 222. For example, the physical mark 212 may indicate a number "1" indicating that it is the first physical mark from the first end 220 and/or the physical mark 212 may indicate a number "4" indicating that it is the fourth physical mark from the second end 222. A processing device may use a lookup table to determine a distance from the first end 220 or the second end 222 based on the number indicated by the physical mark.

A camera-based detection system, which may include the sensing device 16, or another type of system is configured to detect the physical marks 212, 214, 216, and 218 during live arc welding or a welding simulation. Moreover, the camera-based detection system is configured to determine a remaining length of the welding wire 210, a consumed length of the welding wire 210, a rate of use of the welding wire 210, a dipping rate of the welding wire 210, and so forth, based on the detected physical marks. Accordingly, data corresponding to use of the welding wire 210 may be tracked by the welding training system 10 for training and/or analysis.

Figure 12:
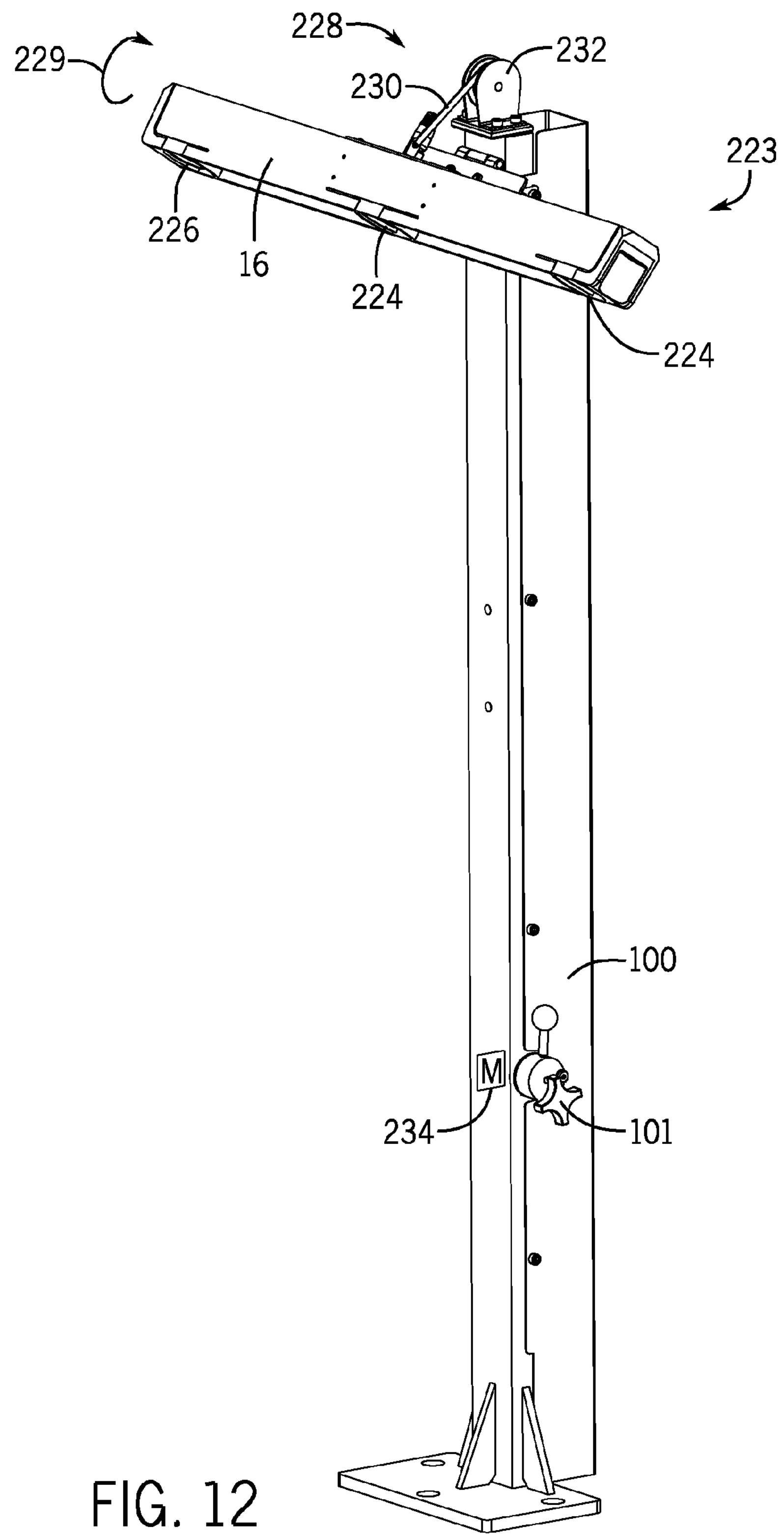
FIG. 12 is a perspective view of an embodiment of a vertical arm assembly of the training stand of FIG. 1 in accordance with aspects of the present disclosure.

FIG. 12 is a perspective view of an embodiment of a vertical arm assembly 223 of the training stand 12 of FIG. 4. As illustrated, the sensing device 16 is attached to the first arm 100. Furthermore, the sensing device 16 includes cameras 224, and an infrared emitter 226. However, in other embodiments, the sensing device 16 may include any suitable number of cameras, emitters, and/or other sensing devices. A pivot assembly 228 is coupled to the first arm 100 and to the sensing device 16, and enables an angle of the sensing device 16 to be adjusted while the sensing device 16 rotates as illustrated by arrow 229. As may be appreciated, adjusting the angle of the sensing device 16 relative to the first arm 100 changes the field of view of the sensing device 16 (e.g., to change the portion of the welding surface 88 and/or the welding surface 112 sensed by the sensing device 16).

A cord 230 extends between the knob 101 and the sensing device 16. The cord 230 is routed through a pulley 232 to facilitate rotation of the sensing device 16. Thus, a welding operator may rotate the knob 101 to manually adjust the angle of the sensing device 16. As may be appreciated, the combination of the cord 230 and the pulley 232 is one example of a system for rotating the sensing device 16. It should be noted that any suitable system may be used to facilitate rotation of the sensing device 16. While one embodiment of a knob 101 is illustrated, it may be appreciated that any suitable knob may be used to adjust the angle of the sensing device 16. Furthermore, the angle of the sensing device 16 may be adjusted using a motor 234 coupled to the cord 230. Accordingly, a welding operator may operate the motor 234 to adjust the angle of the sensing device 16. Moreover, in certain embodiments, control circuitry may be coupled to the motor 234 and may control the angle of the sensing device 16 based on a desired field of view of the sensing device 16 and/or based on tracking of an object within the field of view of the sensing device 16.

Figure 13:
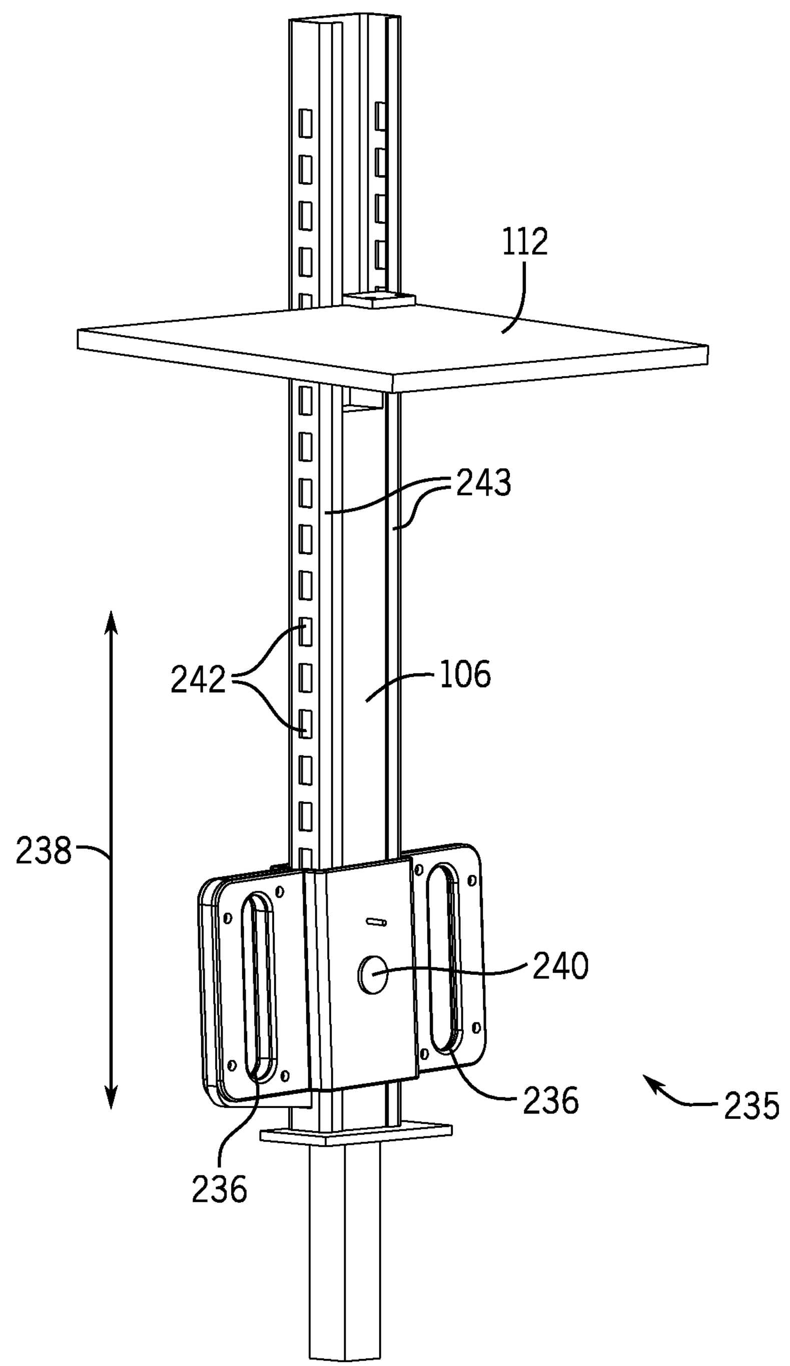
FIG. 13 is a perspective view of an embodiment of an overhead welding arm assembly in accordance with aspects of the present disclosure.

FIG. 13 is a perspective view of an embodiment of an overhead welding arm assembly 235. The overhead welding arm assembly 235 illustrates one embodiment of a manufacturing design that enables the second arm 106 to have an adjustable height. Accordingly, as may be appreciated, the second arm 106 may be manufactured to have an adjustable height in a number of ways. As illustrated, the overhead welding assembly 235 includes handles 236 used to vertically raise and/or lower the second arm 106 as illustrated by arrows 238. The overhead welding arm assembly 235 includes a locking device 240 to lock the second arm 106 at a desired height. For example, the locking device 240 may include a button that is pressed to disengage a latch configured to extend into openings 242, thus unlocking the second arm 106 from being secured to side rails 243. With the second arm 106 unlocked from the side rails 243, the handles 236 may be vertically adjusted to a desired height, thereby adjusting the plate 112 to a desired height. As may be appreciated, releasing the button may result in the latch extending into the openings 242 and locking the second arm 106 to the side rails 243. As may be appreciated, the locking device 240 may operate manually as described and/or the locking device 240 may be controlled by a control system (e.g., automatically controlled). Furthermore, the second arm 106 may be vertically raised and/or lowered using the control system. For example, in certain embodiments, the welding training software may control the second arm 106 to move to a desired position automatically. Thus, the plate 112 may be adjusted to a desired height for overhead welding.

Multi-Mode Welding Training Software

Figure 14:
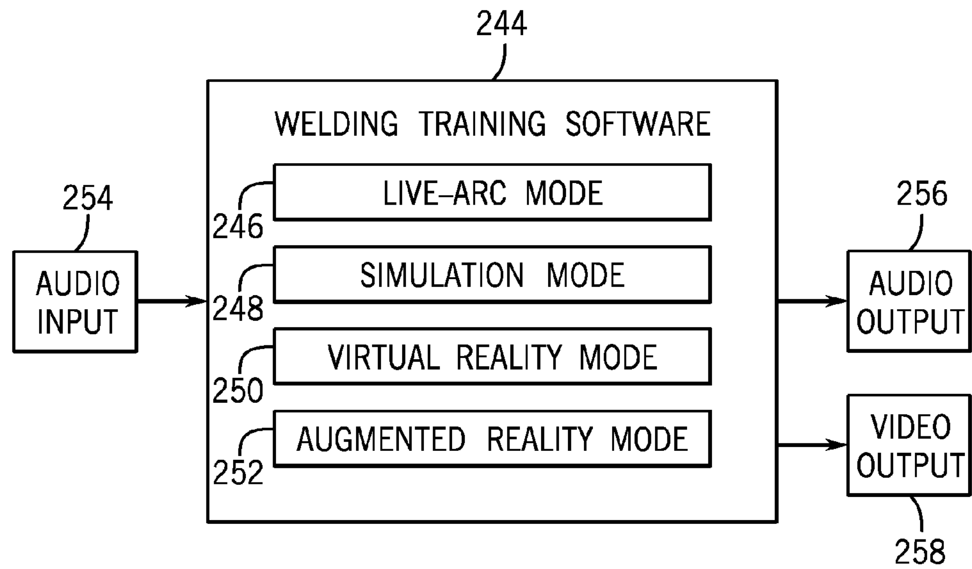
FIG. 14 is a block diagram of an embodiment of welding training software having multiple training modes in accordance with aspects of the present disclosure.

FIG. 14 is a block diagram of an embodiment of welding training software 244 of the welding training system 10 having multiple training modes. As illustrated, the welding training software 244 may include one or more of a live-arc mode 246 configured to enable training using a live (e.g., actual) welding arc, a simulation mode 248 configured to enable training using a welding simulation, a virtual reality (VR) mode 250 configured to enable training using a VR simulation, and/or an augmented reality mode 252 configured to enable training using augmented reality simulation.

The welding training software 244 may receive signals from an audio input 254. The audio input 254 may be configured to enable a welding operator to operate the welding training software 244 using audible commands (e.g., voice activation). Furthermore, the welding training software 244 may be configured to provide an audio output 256 and/or a video output 258. For example, the welding training software 244 may provide audible information to a welding operator using the audio output 256. Such audible information may include instructions for configuring (e.g., setting up) the welding training system 10, real-time feedback provided to a welding operator during a welding operation, instructions to a welding operator before performing a welding operation, instructions to a welding operator after performing a welding operation, warnings, and so forth.

Figure 15:
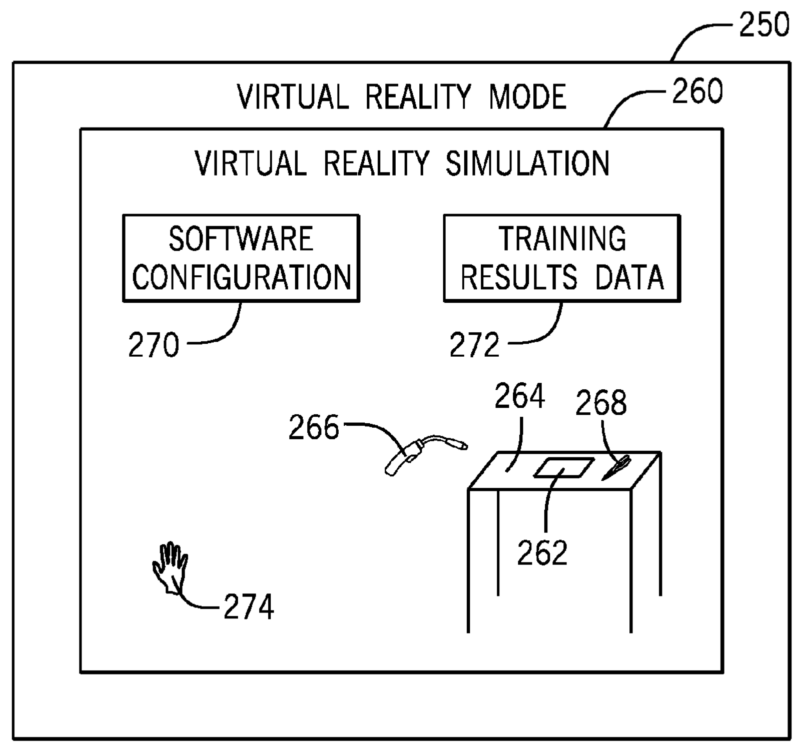
FIG. 15 is a block diagram of an embodiment of a virtually reality mode of welding training software in accordance with aspects of the present disclosure.

FIG. 15 is a block diagram of an embodiment of the VR mode 250 of the welding training software 244. The VR mode 250 is configured to provide a welding operator with a VR simulation 260. The VR simulation 260 may be displayed to a welding operator through a VR headset, VR glasses, a VR display, or any suitable VR device. The VR simulation 260 may be configured to include a variety of virtual objects, such as the objects illustrated in FIG. 15, that enable interaction between a welding operator and a selected virtual object of the variety of virtual objects within the VR simulation 260. For example, virtual objects may include a virtual workpiece 262, a virtual welding stand 264, a virtual welding torch 266, virtual wire cutters 268, virtual software configuration 270, virtual training data results 272, and/or a virtual glove 274.

In certain embodiments, the welding operator may interact with the virtual objects without touching a physical object. For example, the sensing device 16 may detect movement of the welding operator and may result in similar movements occurring in the VR simulation 260 based on the welder operator's movements in the real world. In other embodiments, the welding operator may use a glove or the welding torch 14 to interact with the virtual objects. For example, the glove or the welding torch 14 may be detected by the sensing device 16, and/or the glove or the welding torch 14 may correspond to a virtual object in the VR simulation 260. Furthermore, the welding operator may be able to operate the welding training software 244 within the VR simulation 260 using the virtual software configuration 270 and/or the virtual training data results 272. For example, the welding operator may use their hand, the glove, or the welding torch 14 to select items within the welding training software 244 that are displayed virtually within the VR simulation 260. Moreover, the welding operator may perform other actions such as picking up wire cutters and cutting virtual welding wire extending from the virtual torch 266, all within the VR simulation 260.

Figure 16:
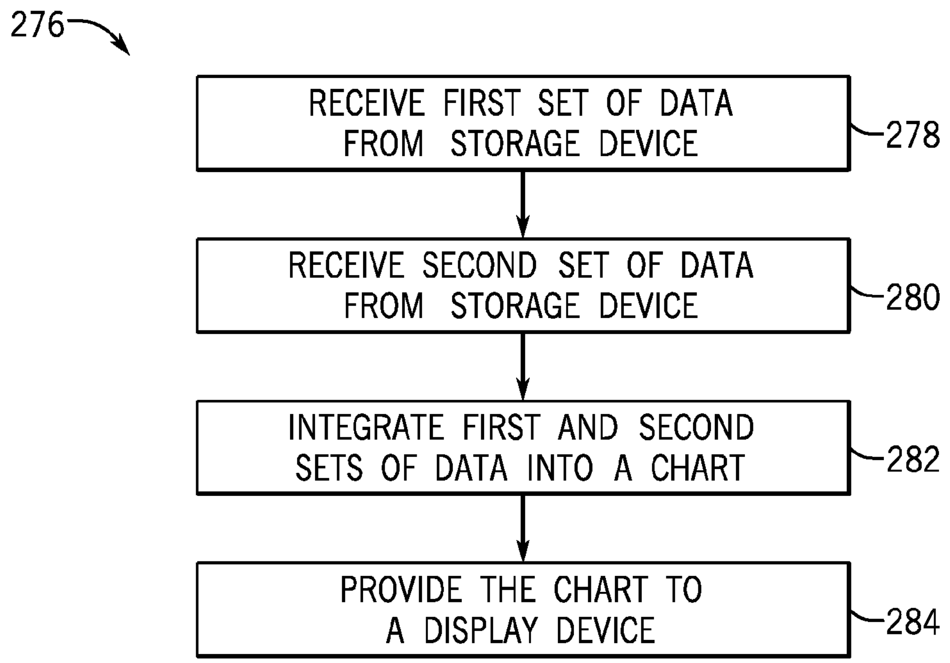
FIG. 16 is an embodiment of a method for integrating training results data in accordance with aspects of the present disclosure.

FIG. 16 is an embodiment of a method 276 for integrating training results data. The method 276 includes the welding training software 244 of the computer 18 receiving a first set of welding training data from a storage device (e.g., storage device 24) (block 278). The first set of welding training data may include welding training data corresponding to a first welding training assignment. The method 276 also includes the welding training software 244 receiving a second set of welding training data from the storage device (block 280). In certain embodiments, the first set and/or second set of welding training data may be received from a network storage device. The network storage device may be configured to receive welding training data from and/or to provide welding training data to the welding training system 10 and/or the external welding training system 40. The welding training software 244 may integrate the first and second sets of welding training data into a chart to enable a visual comparison of the first set of welding training data with the second set of welding training data (block 282). As may be appreciated, the chart may be a bar chart, a pie chart, a line chart, a histogram, and so forth. In certain embodiments, integrating the first set of welding training data with the second set of welding training data includes filtering the first set of welding training data and the second set of welding training data to display a subset of the first set of welding training data and a subset of the second set of welding training data. The welding training software 244 may provide the chart to a display device (e.g., the display 32) (block 284). In certain embodiments, providing the chart to the display device includes providing selectable elements on the chart that when selected display data corresponding to a respective selected element of the selectable elements (e.g., selecting wire speed from the chart may change the screen to display the wire speed history for a particular welding training assignment).

The first set of welding training data and/or the second set of welding training data may include a welding torch orientation, a welding torch travel speed, a welding torch position, a contact tip to workpiece distance, a proximity of the welding torch in relation to the workpiece, an aim of the welding torch, a welding score, a welding grade, and so forth. Moreover, the first set of welding training data and the second set of welding training data may correspond to training performed by one welding operator and/or by a class of welding operators. Furthermore, the first welding training assignment and the second welding training assignment may correspond to training performed by one welding operator and/or by a class of welding operators. In certain embodiments, the first welding training assignment may correspond to training performed by a first welding operator, and the second welding training assignment may correspond to welding performed by a second welding operator. Moreover, the first training assignment and the second training assignment may correspond to the same welding training scenario.

Figure 17:
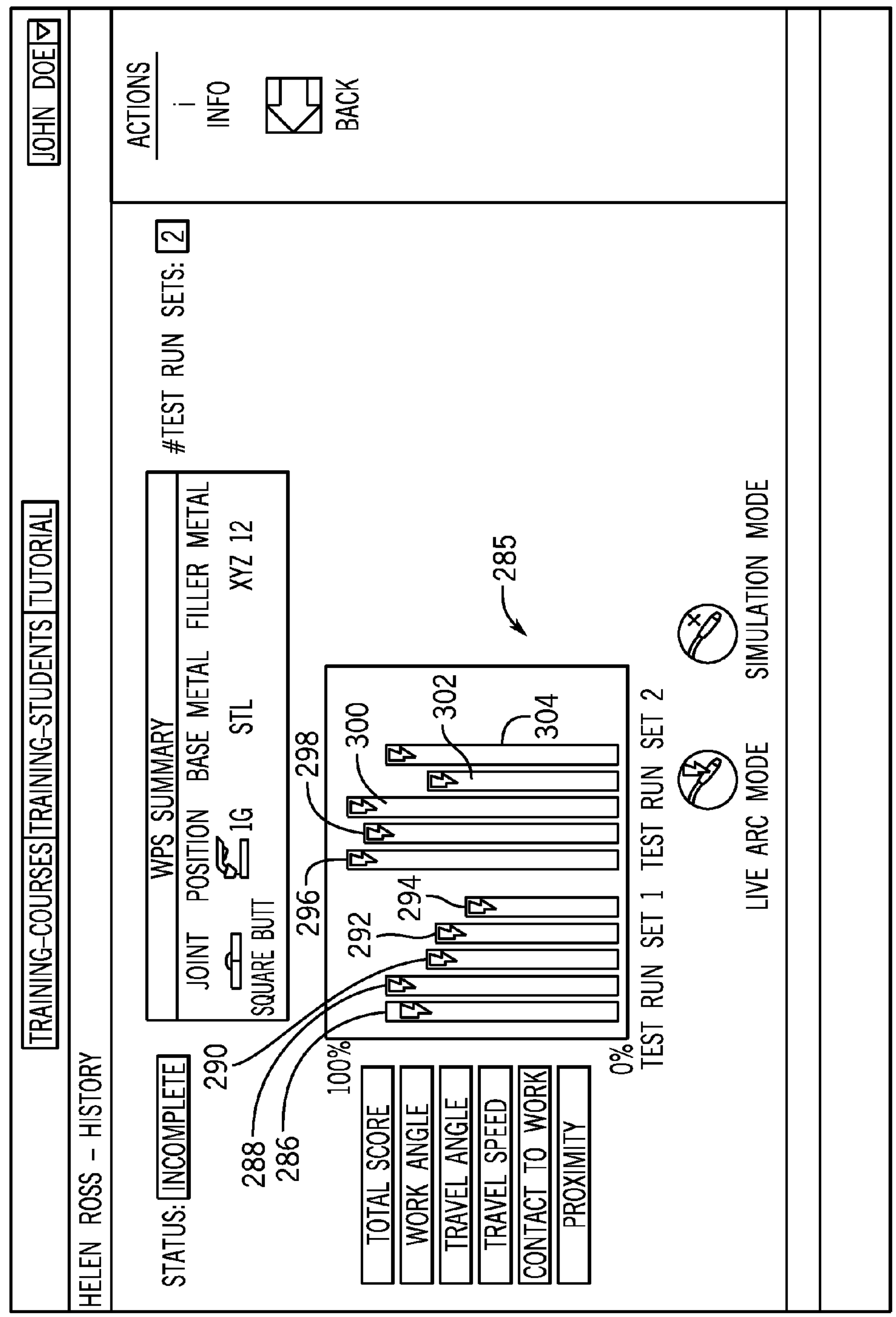
FIG. 17 is an embodiment of a chart illustrating multiple sets of welding training data for a welding operator in accordance with aspects of the present disclosure.

FIG. 17 is an embodiment of a chart 285 illustrating multiple sets of welding training data for a welding operator. The chart 285 may be produced by the welding training software 244 and may be provided to the display 32 to be used by a welding instructor to review welding training operators performed by a welding student, and/or may be provided to the display 32 to be used by a welding student to review welding training operations performed by that welding student. The chart 285 illustrates a bar graph comparison between different training assignments of a first set of welding training assignments performed by a welding operator. The first set of welding training assignments includes assignments 286, 288, 290, 292, and 294. The chart 285 also illustrates a bar graph comparison between different training assignments of a second set of welding training assignments performed by the welding operator. The second set of welding training assignments includes assignments 296, 298, 300, 302, and 304. Accordingly, welding training assignments may be compared to one another for analysis, instruction, certification, and/or training purposes. As illustrated, the welding training assignments may be compared to one another using one of any number of criteria, such as a total score, a work angle, a travel angle, a travel speed, a contact to work distance, a proximity, a mode (e.g., live-arc mode, simulation mode, etc.), a completion status (e.g., complete, incomplete, partially complete, etc.), a joint type (e.g., fillet, butt, T, lap, etc.), a welding position (e.g., flat, vertical, overhead, etc.), a type of metal used, a type of filler metal, and so forth.

Figure 18:
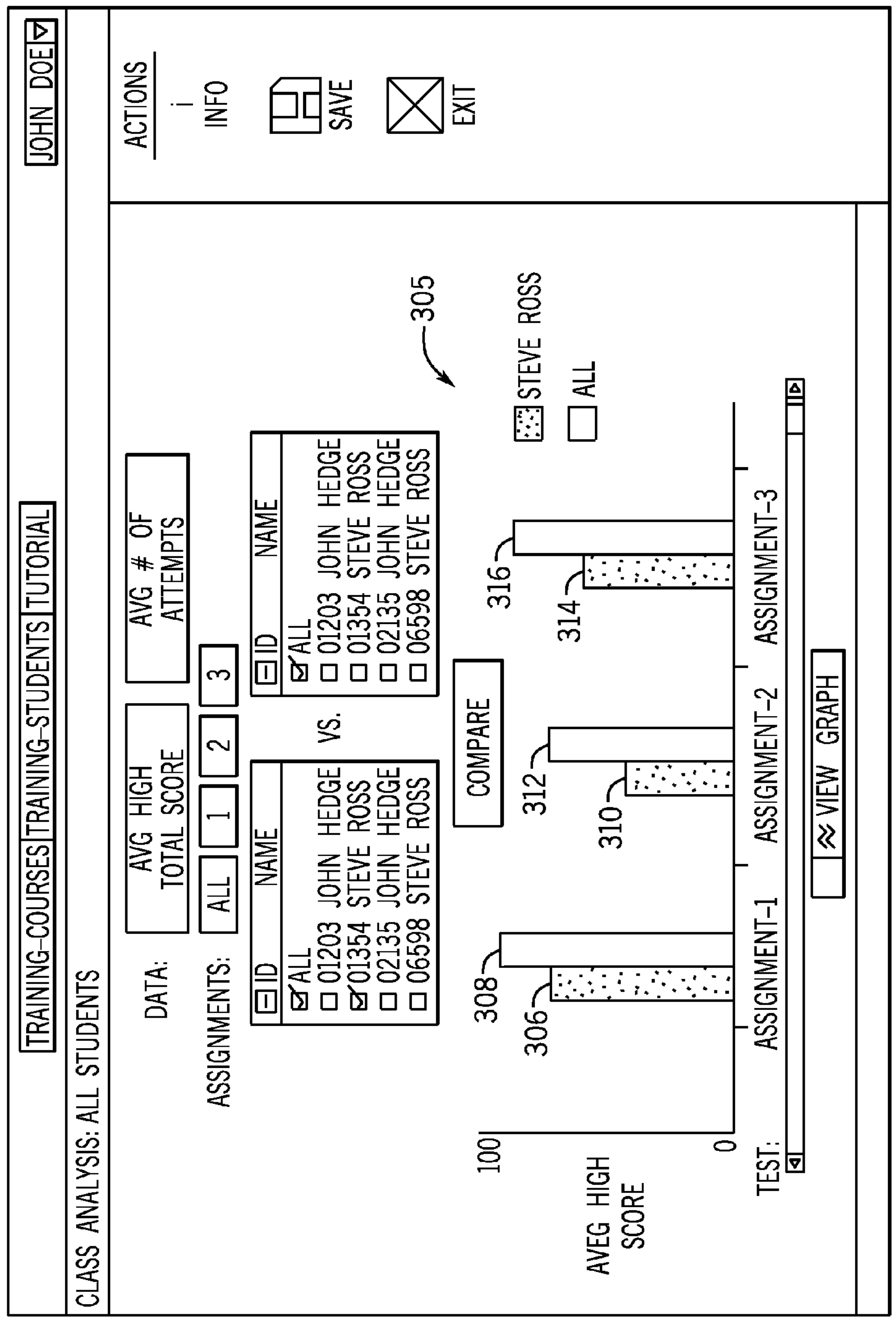
FIG. 18 is an embodiment of a chart illustrating welding training data for a welder compared to welding training data for a class in accordance with aspects of the present disclosure.

FIG. 18 is an embodiment of a chart 305 illustrating welding training data for a welder compared to welding training data for a class. For example, the chart 305 illustrates a score 306 of a welding operator compared to a score 308 (e.g., average, median, or some other score) of a class for a first assignment. Furthermore, a score 310 of the welding operator is compared to a score 312 (e.g., average, median, or some other score) of the class for a second assignment. Moreover, a score 314 of the welding operator is compared to a score 316 (e.g., average, median, or some other score) of the class for a third assignment. As may be appreciated, scores from one or more welding operators may be compared to scores of the entire class. Such a comparison enables a welding instructor to assess the progress of individual welding students as compared to the class of welding students. Furthermore, scores from one or more welding operators may be compared to scores of one or more other welding operators. In certain embodiments, scores from one class may be compared to scores of another class. Moreover, scores from the first assignment, the second assignment, and/or the third assignment may be selected for comparison.

Data Storage and Analysis

Figure 19:
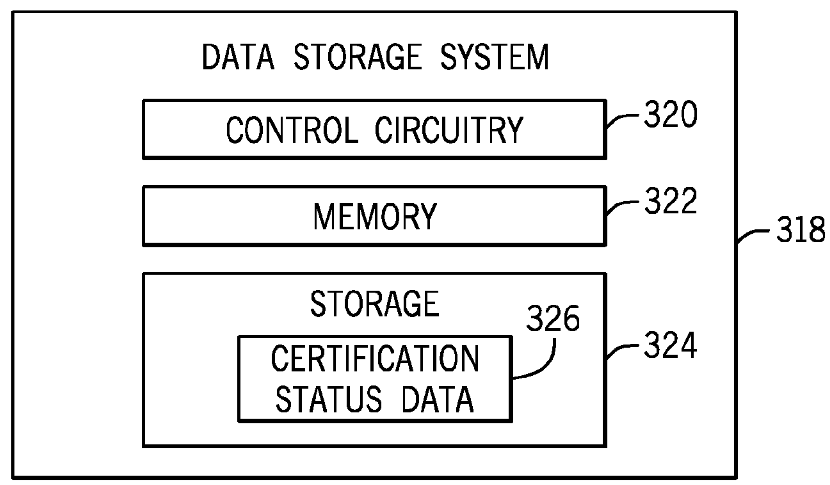
FIG. 19 is a block diagram of an embodiment of a data storage system for storing certification status data in accordance with aspects of the present disclosure.

FIG. 19 is a block diagram of an embodiment of a data storage system 318 for storing certification status data. The certification status data may be produced as a welding operator completes various assignments in the welding training system 10. For example, a predetermined set of assignments may certify a welding operator for a particular welding device and/or welding process. The data storage system 318 includes control circuitry 320, one or more memory devices 322, and one or more storage devices 324. The control circuitry 320 may include one or more processors, which may be similar to the processor(s) 20. Furthermore, the memory device(s) 322 may be similar to the memory device(s) 22, and the storage device(s) 324 may be similar to the storage device(s) 24. The memory device(s) 322 and/or the storage device(s) 324 may be configured to store certification status data 326 corresponding to a welding training certification of a welding operator.

The certification status data 326 may include welding training data of the welding operator (e.g., any data that is related to the assignments to certify the welding operator), any data related to an actual certification (e.g., certified, not certified, qualified, not qualified, etc.), a quantity of one or more welds performed by the welding operator, a timestamp for one or more welds performed by the welding operator, welding parameter data for one or more welds performed by the welding operator, a quality ranking of the welding operator, a quality level of the welding operator, a history of training welds performed by the welding operator, a history of production welds performed by the welding operator, a first welding process (e.g., a metal inert gas (MIG) welding process, a tungsten inert gas (TIG) welding process, a stick welding process, etc.) certification status (e.g., the welding operator is certified for the first welding process, the welding operator is not certified for the first welding process), a second welding process certification status (e.g., the welding operator is certified for the second welding process, the welding operator is not certified for the second welding process), a first welding device (e.g., a wire feeder, a power supply, a model number, etc.) certification status (e.g., the welding operator is certified for the first welding device, the welding operator is not certified for the first welding device), and/or a second welding device certification status (e.g., the welding operator is certified for the second welding device, the welding operator is not certified for the second welding device).

The control circuitry 320 may be configured to receive a request for the first welding process certification status, the second welding process certification status, the first welding device certification status, and/or the second welding device certification status of the welding operator. Furthermore, the control circuitry 320 may be configured to provide a response to the request. The response to the request may include the first welding process certification status, the second welding process certification status, the first welding device certification status, and/or the second welding device certification status of the welding operator. In certain embodiments, the welding operator may be authorized to use a first welding process, a second welding process, a first welding device, and/or a second welding device based at least partly on the response. Furthermore, in some embodiments, the first welding process, the second welding process, the first welding device, and/or the second welding device of a welding system may be enabled or disabled based at least partly on the response. Moreover, in certain embodiments, the first welding process, the second welding process, the first welding device, and/or the second welding device of a welding system may be enabled or disabled automatically. Thus, a welding operator's certification data may be used to enable and/or disable that welding operator's ability to use a particular welding system, welding device, and/or welding process. For example, a welding operator may have a certification for a first welding process, but not for a second welding process. Accordingly, in certain embodiments, a welding operator may verify their identity at a welding system (e.g., by logging in or some other form of authentication). After the identity of the welding operator is verified, the welding system may check the welding operator's certification status. The welding system may enable the welding operator to perform operations using the first welding process based on the welding operator's certification status, but may block the welding operator from performing the second welding process based on the welding operator's certification status.

Figure 20:
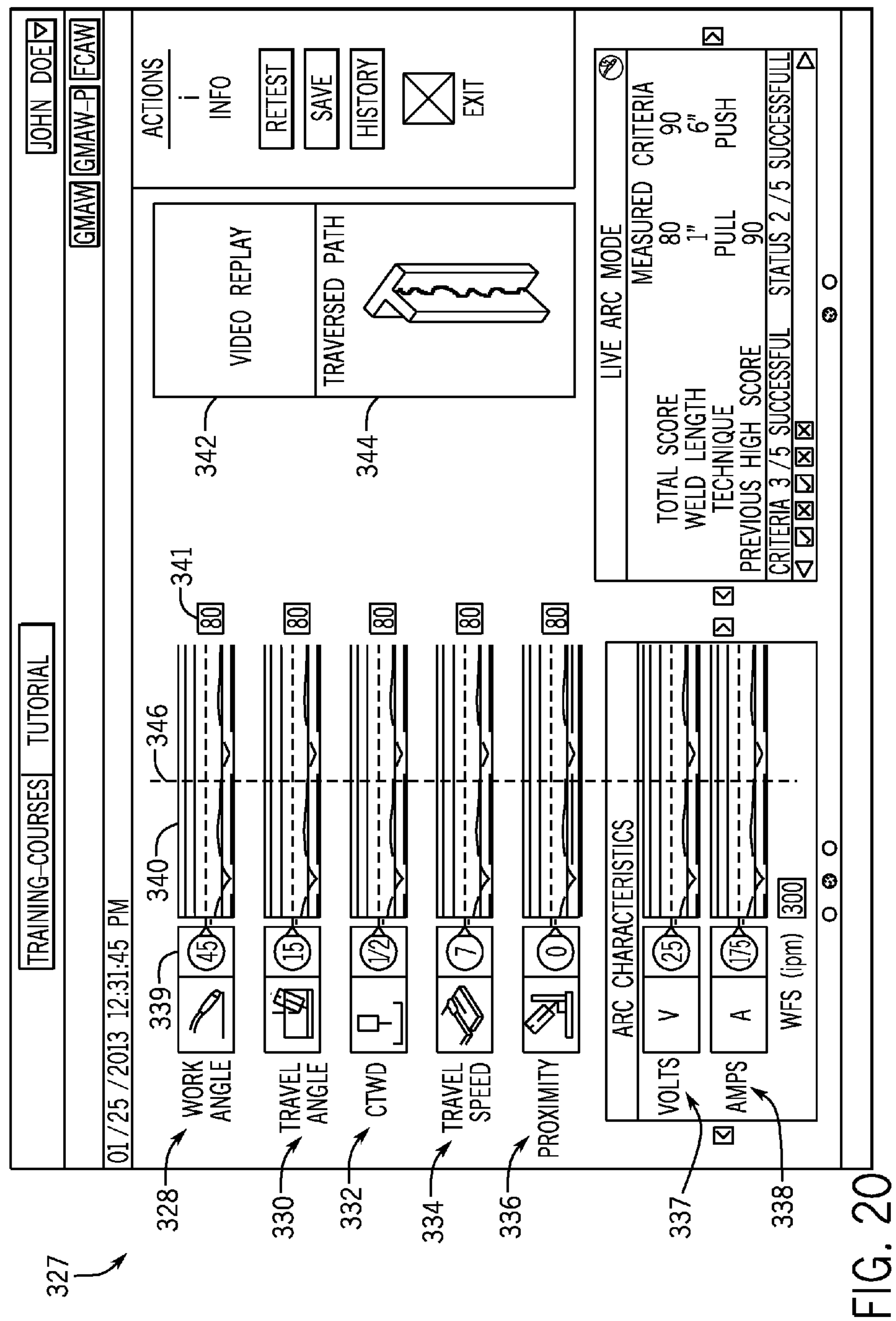
FIG. 20 is an embodiment of a screen illustrating data corresponding to a training weld in accordance with aspects of the present disclosure.

FIG. 20 is an embodiment of a screen 327 illustrating data corresponding to a training weld. The screen 327 may be produced by the welding training software 244 and may be displayed on the display 32. The screen 327 illustrates parameters that may be graphically displayed to a welding operator before, during, and/or after performing a welding operation. For example, the parameters may include a work angle 328, a travel angle 330, a contact tip to workpiece distance 332, a welding torch travel speed 334, a proximity of the welding torch in relation to the workpiece 336, a welding voltage 337, a welding current 338, a welding torch orientation, a welding torch position, an aim of the welding torch, and so forth.

As illustrated, graphically illustrated parameters may include an indication 339 of a current value of a parameter (e.g., while performing a welding assignment). Furthermore, a graph 340 may show a history of the value of the parameter, and a score 341 may show an overall percentage that corresponds to how much time during the welding assignment that the welding operator was within a range of acceptable values. In certain embodiments, a video replay 342 of a welding assignment may be provided on the screen

327. The video replay 342 may show live video of a welding operator performing a real weld, live video of the welding operator performing a simulated weld, live video of the welding operator performing a virtual reality weld, live video of the welding operator performing an augmented reality weld, live video of a welding arc, live video of a weld puddle, and/or simulated video of a welding operation.

In certain embodiments, the welding training system 10 may capture video data during a welding assignment, and store the video data on the storage device 24. Moreover, the welding training software 244 may be configured to retrieve the video data from the storage device 24, to retrieve welding parameter data from the storage device 24, to synchronize the video data with the welding parameter data, and to provide the synchronized video and welding parameter data to the display 32.

The welding training software 244 may analyze welding parameter data to determine a traversed path 344 that may be shown on the display 32. In some embodiments, a time 346 during a weld may be selected by a welding operator. By selecting the time 346, the welding operator may view the video replay 342 and/or the traversed path 344 in conjunction with the welding parameters as they were at the selected time 346 in order to establish a correlation between the welding parameters, the video replay 342, and/or the traversed path 344. The welding training software 244 may be configured to recreate welding training data based at least partly on welding parameter data, to synchronize the video replay 342 with the recreated welding training data, and to provide the synchronized video replay 342 and recreated welding training data to the display 32. In certain embodiments, the recreated welding training data may be weld puddle data and/or a simulated weld.

In certain embodiments, the storage device 24 may be configured to store a first data set corresponding to multiple training welds performed by a welding operator, and to store a second data set corresponding to multiple non-training welds performed by the welding operator. Furthermore, the control circuitry 320 may be configured to retrieve at least part of the first data set from the storage device 24, to retrieve at least part of the second data set from the storage device 24, to synchronize the at least part of the first data set with the at least part of the second data set, and to provide the synchronized at least part of the first data set and at least part of the second data set to the display 32.

Figure 21:
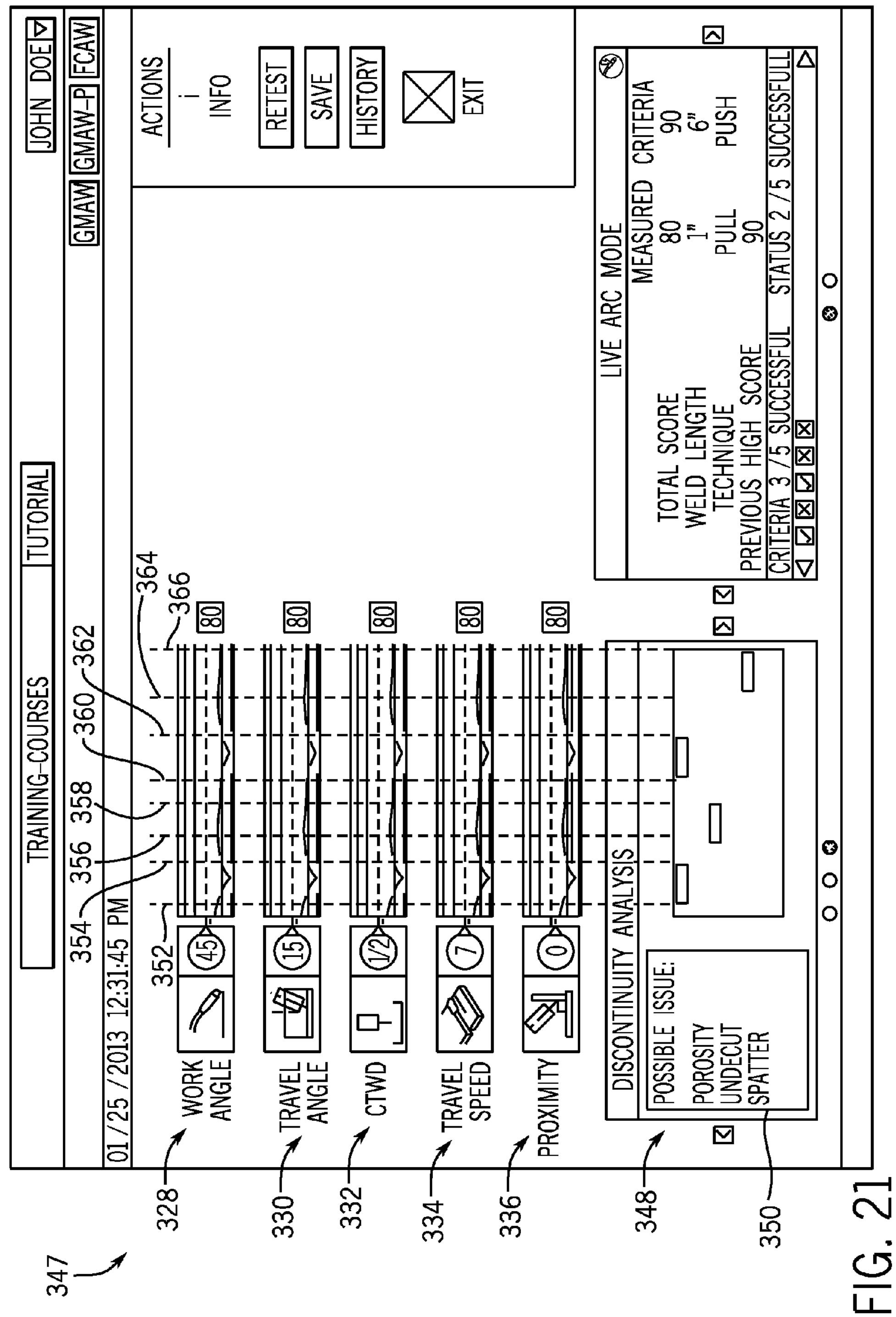
FIG. 21 is an embodiment of a screen illustrating a discontinuity analysis of a training weld in accordance with aspects of the present disclosure.

FIG. 21 is an embodiment of a screen 347 illustrating a discontinuity analysis 348 of a training weld. The discontinuity analysis 348 includes a listing 350 that may itemize potential issues with a welding operation. The discontinuity analysis 348 provides feedback to the welding operator regarding time periods within the welding operation in which the weld does not meet a predetermined quality threshold. For example, between times 352 and 354, there is a high discontinuity (e.g., the welding quality is poor, the weld has a high probability of failure, the weld is defective). Furthermore, between times 356 and 358, there is a medium discontinuity (e.g., the welding quality is average, the weld has a medium probability of failure, the weld is partially defective). Moreover, between times 360 and 362, there is a high discontinuity, and between times 364 and 366, there is a low discontinuity (e.g., the welding quality is good, the weld has a low probability of failure, the weld is not defective). With this information a welding operator may be able to quickly analyze the quality of a welding operation.

Figure 22:
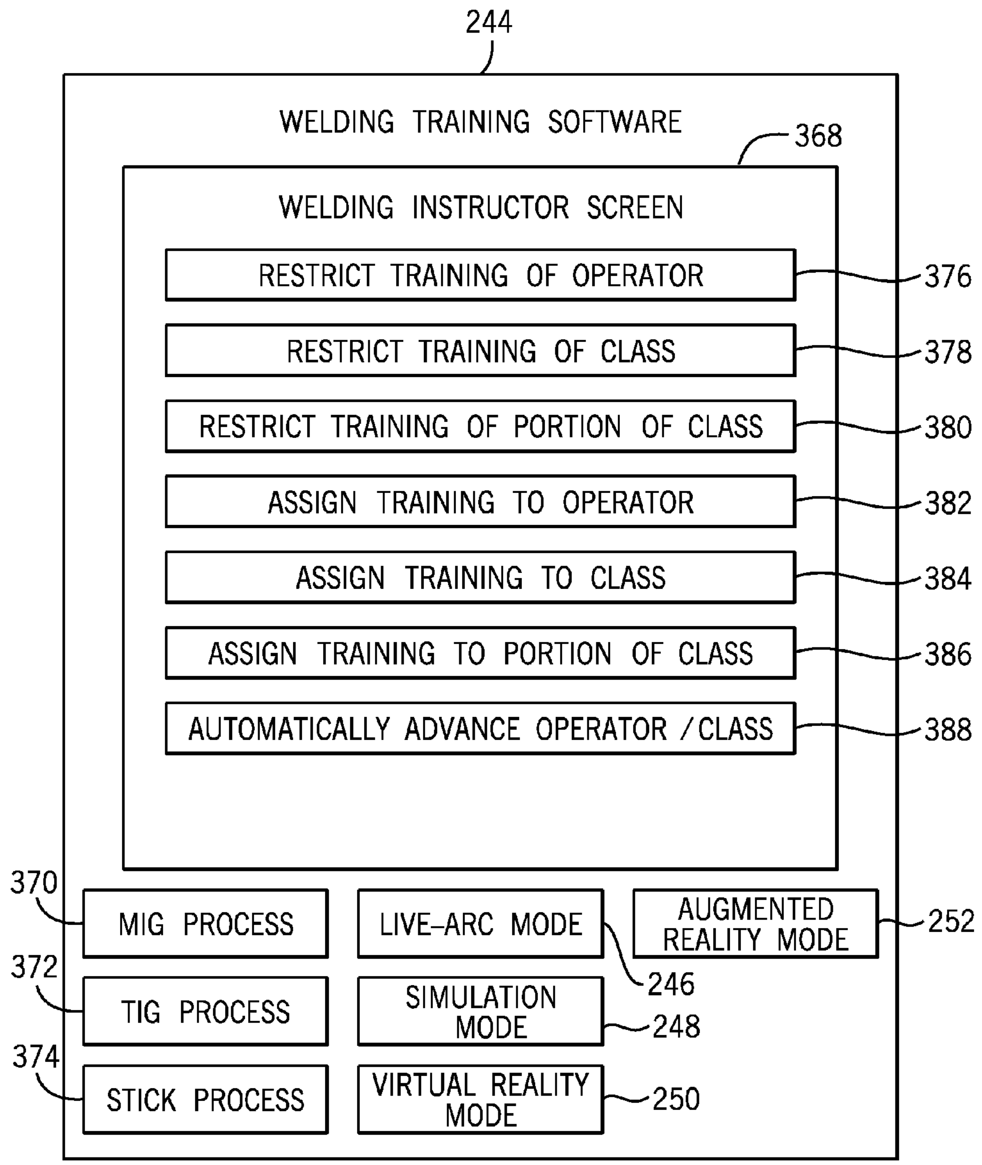
FIG. 22 is a block diagram of an embodiment of a welding instructor screen of welding training software in accordance with aspects of the present disclosure.

FIG. 22 is a block diagram of an embodiment of a welding instructor screen 368 of the welding training software 244. The welding training software 244 is configured to provide training simulations for many different welding configurations. For example, the welding configurations may include a MIG welding process 370, a TIG welding process 372, a stick welding process 374, the live-arc welding mode 346, the simulation welding mode 248, the virtual reality welding mode 250, and/or the augmented reality welding mode 252.

The welding instructor screen 368 may be configured to enable a welding instructor to restrict training of a welding operator 376 (e.g., to one or more selected welding configurations), to restrict training of a class of welding operators 378 (e.g., to one or more selected welding configurations), and/or to restrict training of a portion of a class of welding operators 380 (e.g., to one or more selected welding configurations). Moreover, the welding instructor screen 368 may be configured to enable the welding instructor to assign selected training assignments to the welding operator 382, to assign selected training assignments to a class of welding operators 384, and/or to assign selected training assignments to a portion of a class of welding operators 386. Furthermore, the welding instructor screen 368 may be configured to enable the welding instructor to automatically advance the welding operator (or a class of welding operators) from a first training assignment to a second training assignment 388. For example, the welding operator may advance from a first training assignment to a second training assignment based at least partly on a quality of performing the first training assignment.

Figure 23:
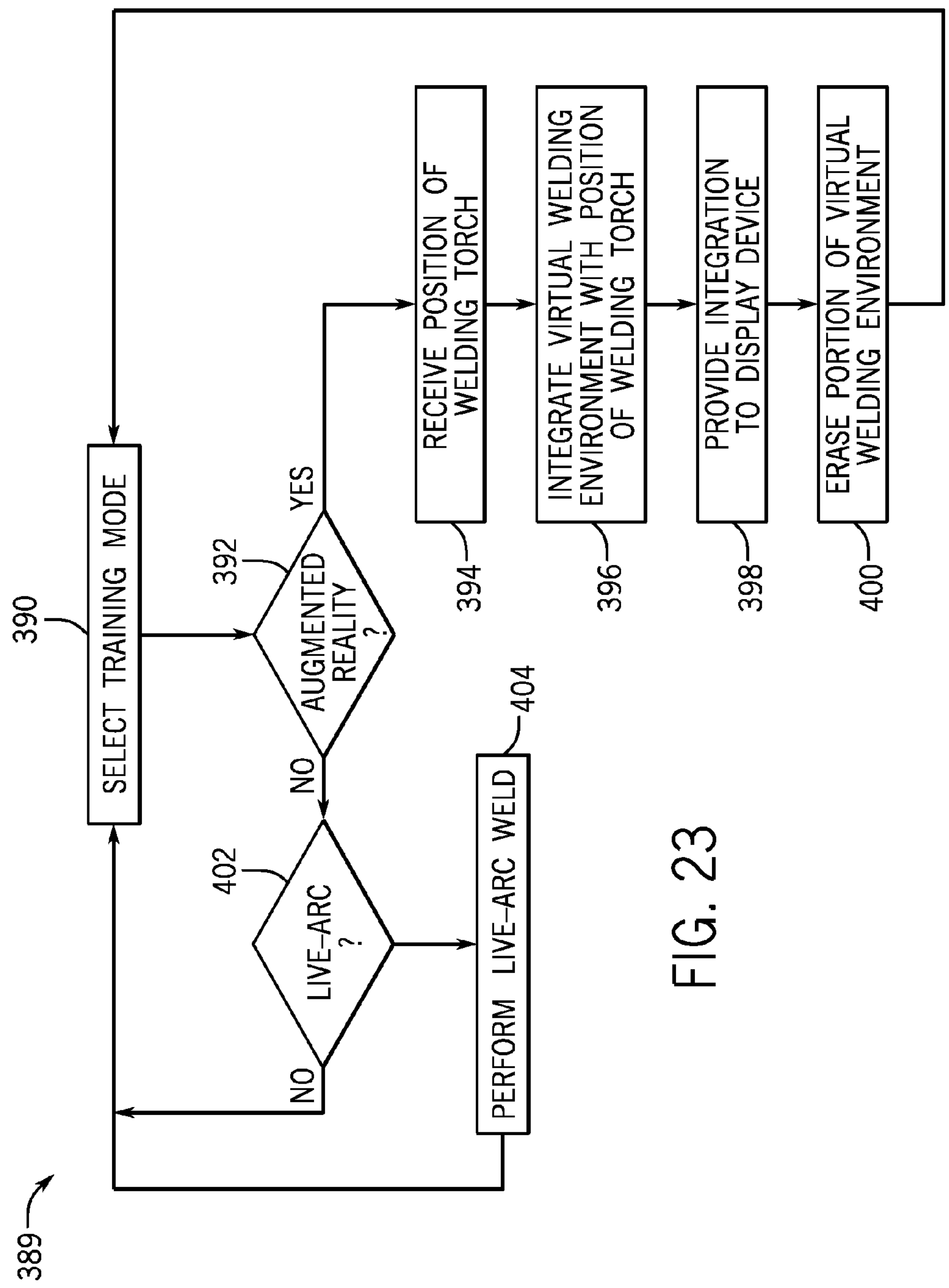
FIG. 23 is an embodiment of a method for weld training using augmented reality in accordance with aspects of the present disclosure.

FIG. 23 is an embodiment of a method 389 for weld training using augmented reality. A welding operator may select a training mode of the welding training software 244 (block 390). The welding training software 244 determines whether the augmented reality mode 252 has been selected (block 392). If the augmented reality mode 252 has been selected, the welding training software 244 executes an augmented reality simulation. It should be noted that the welding operator may be wearing a welding helmet and/or some other headgear configured to position a display device in front of the welding operator's view. Furthermore, the display device may generally be transparent to enable the welding operator to view actual objects; however, a virtual welding environment may be portrayed on portions of the display device. As part of this augmented reality simulation, the welding training software 244 receives a position and/or an orientation of the welding torch 14, such as from the sensing device 16 (block 394). The welding training software 244 integrates the virtual welding environment with the position and/or the orientation of the welding torch 14 (block 396). Moreover, the welding training software 244 provides the integrated virtual welding environment to the display device (block 398). For example, the welding training software 244 may determine where a weld bead should be positioned within the welding operator's field of view, and the welding training software 244 may display the weld bead on the display device such that the weld bead appears to be on a workpiece. After completion of the weld, the augmented reality simulation may enable the welding operator to erase a portion of the virtual welding environment (e.g., the weld bead) (block 400), and the welding training software 244 returns to block 390.

If the augmented realty mode 252 has not been selected, the welding training software 244 determines whether the live-arc mode 246 has been selected (block 402). If the live-arc mode 246 has been selected, the welding training software 244 enters the live-arc mode 246 and the welding operator may perform the live-arc weld (block 404). If the live-arc mode 246 has not been selected and/or after executing block 404, the welding training software 244 returns to block 390. Accordingly, the welding training software 244 is configured to enable a welding operator to practice a weld in the augmented reality mode 252, to erase at least a portion of the virtual welding environment from the practice weld, and to perform a live weld in the live-arc mode 246. In certain embodiments, the welding operator may practice the weld in the augmented reality mode 252 consecutively a multiple number of times.

Figure 24:
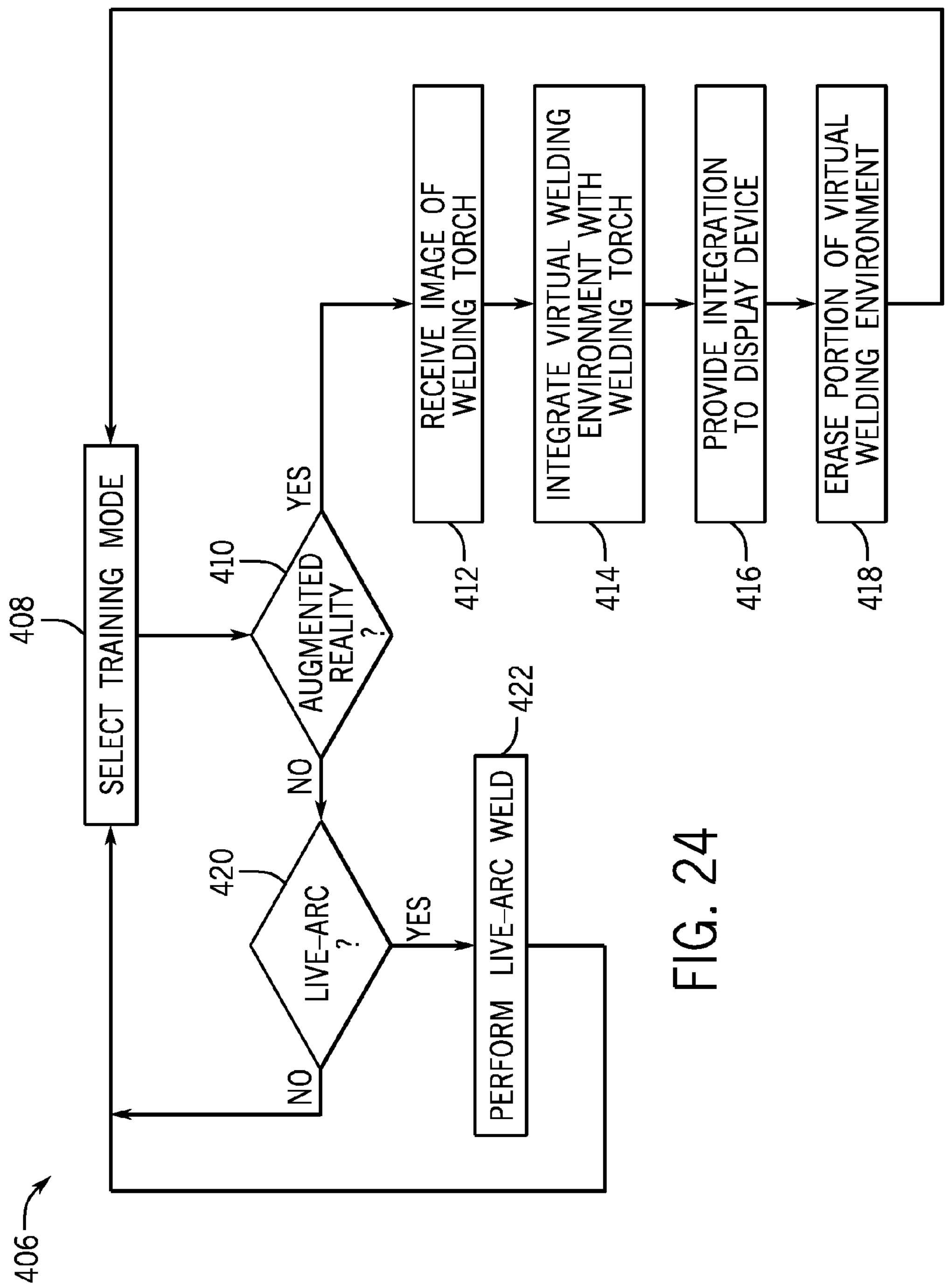
FIG. 24 is an embodiment of another method for weld training using augmented reality in accordance with aspects of the present disclosure.

FIG. 24 is an embodiment of another method 406 for weld training using augmented reality. A welding operator may select a training mode of the welding training software 244 (block 408). The welding training software 244 determines whether the augmented reality mode 252 has been selected (block 410). If the augmented reality mode 252 has been selected, the welding training software 244 executes an augmented reality simulation. It should be noted that the welding operator may be wearing a welding helmet and/or some other headgear configured to position a display device in front of the welding operator's view. Furthermore, the display device may completely block the welding operator's field of vision such that images observed by the welding operator have been captured by a camera and displayed on the display device. As part of this augmented reality simulation, the welding training software 244 receives an image of the welding torch 14, such as from the sensing device 16 (block 412). The welding training software 244 integrates the virtual welding environment with the image of the welding torch 14 (block 414). Moreover, the welding training software 244 provides the integrated virtual welding environment with the image of the welding torch 14 to the display device (block 416). For example, the welding training software 244 may determine where a weld bead should be positioned within the welding operator's field of view and the welding training software 244 displays the weld bead on the display device with the image of the welding torch 14 and other objects in the welding environment. After completion of the weld, the augmented reality simulation may enable the welding operator to erase a portion of the virtual welding environment (e.g., the weld bead) (block 418), and the welding training software 244 returns to block 408.

If the augmented realty mode 252 has not been selected, the welding training software 244 determines whether the live-arc mode 246 has been selected (block 420). If the live-arc mode 246 has been selected, the welding training software 244 enters the live-arc mode 246 and the welding operator may perform the live-arc weld (block 422). If the live-arc mode 246 has not been selected and/or after executing block 422, the welding training software 244 returns to block 408. Accordingly, the welding training software 244 is configured to enable a welding operator to practice a weld in the augmented reality mode 252, to erase at least a portion of the virtual welding environment from the practice weld, and to perform a live weld in the live-arc mode 246. In certain embodiments, the welding operator may practice the weld in the augmented reality mode 252 consecutively a multiple number of times.

As may be appreciated, using the systems, devices, and techniques described herein, a welding training system 10 may be provided for training welding operators. The welding training system 10 may be cost efficient and may enable welding students to receive high quality hands on training.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding training system comprising:

a non-transitory memory comprising processor-executable instructions; and a processor coupled to the non-transitory memory and configured to execute the processor-executable instructions, wherein the processor-executable instructions comprise instructions to:

enable operation of the welding training system in three or more modes, wherein the three or more modes comprise a live-arc mode, a simulation mode, a virtual reality mode, an augmented reality mode, or some combination thereof;

receive an input corresponding to at least one of the three or more modes;

control a training switch to enable welding power to flow through a welding torch when the received input corresponds to the live-arc mode;

control the training switch to disable welding power from flowing through the welding torch when the received input corresponds to the simulation mode or the virtual reality mode;

display a virtual reality simulation via a display device when the received input corresponds to the virtual reality mode; and display an augmented reality simulation via the display device when the received input corresponds to the augmented reality mode, wherein the augmented reality simulation comprises a virtual welding environment integrated with object data relating to the welding torch received from a sensing device, wherein the object data comprises a position of the welding torch, an orientation of the welding torch, or an image of the welding torch, or any combination thereof.

2. The welding training system of claim 1, wherein the processor-executable instructions comprise instructions to generate audible information.

3. The welding training system of claim 2, wherein the audible information comprises instructions for configuring the welding training system.

4. The welding training system of claim 2, wherein the audible information comprises real-time feedback generated during a welding operation.

5. The welding training system of claim 1, wherein the input comprises audible commands from a welding operator.

6. A welding training system comprising:

a non-transitory memory comprising processor-executable instructions; and a processor coupled to the non-transitory memory and to an optical sensing device configured to detect real world movement of a welding operator in an environment relative to the optical sensing device, wherein the processor is configured to execute the processor-executable instructions, wherein the processor-executable instructions comprise instructions to:

display a virtual reality simulation via a display device in a virtual reality mode, wherein the virtual reality mode is configured to enable training using the virtual reality simulation, the virtual reality simulation comprises a virtual selection tool and a plurality of virtual objects, wherein the plurality of virtual objects comprises welding training software configuration items, training results data, or some combination thereof; and receive a selection input of a selected virtual object of the plurality of virtual objects, wherein the detected real world movement of the welding operator relative to the optical sensing device corresponds to displayed movement of the virtual selection tool within the virtual reality simulation, and the received selection input is a displayed interaction of the virtual selection tool and the selected virtual object within the virtual reality simulation.

7. The welding training system of claim 6, wherein the plurality of virtual objects comprises a welding torch, a workpiece, wire cutters, or some combination thereof.

8. The welding training system of claim 6, wherein the selection input is received without the welding operator touching a real world physical object in the environment that corresponds to the selected virtual object in the virtual reality simulation.

9. The welding training system of claim 6, wherein the plurality of virtual objects comprises an icon in the virtual reality simulation.

10. The welding training system of claim 6, wherein the plurality of virtual objects comprises virtual training data results.

11. The welding training system of claim 6, wherein the detected real world movement of the welding operator relative to the optical sensing device comprises movement of a hand of the welding operator.

12. The welding training system of claim 6, wherein the detected real world movement of the welding operator relative to the optical sensing device comprises movement of a glove coupled to the welding operator.

13. The welding training system of claim 6, wherein the detected real world movement of the welding operator relative to the optical sensing device comprises movement of a welding torch.

* * * * *